(12) United States Patent
Wu

(10) Patent No.: US 7,190,681 B1
(45) Date of Patent: Mar. 13, 2007

(54) ERROR CODING IN ASYNCHRONOUS TRANSFER MODE, INTERNET AND SATELLITES

(76) Inventor: William W. Wu, 6 Spruce Tree Ct., Bethesda, MD (US) 20814-1625

( * ) Notice: Subject to any disclaimer, the term of this patent is extended or adjusted under 35 U.S.C. 154(b) by 487 days.

(21) Appl. No.: 10/456,486

(22) Filed: Jun. 9, 2003

Related U.S. Application Data

(63) Continuation-in-part of application No. 09/391,900, filed on Sep. 7, 1999, now abandoned, which is a continuation-in-part of application No. 08/679,364, filed on Jul. 10, 1996, now abandoned.

(51) Int. Cl.
*H04B 7/185* (2006.01)
*G06F 11/00* (2006.01)

(52) U.S. Cl. ............... 370/316; 370/326; 370/389; 370/395.1

(58) Field of Classification Search ............... None
See application file for complete search history.

(56) References Cited

U.S. PATENT DOCUMENTS

| | | |
|---|---|---|
| 3,303,333 A | 2/1967 | Massey |
| 3,662,338 A | 5/1972 | Cain, III |
| 3,665,396 A | 5/1972 | Forney, Jr. |
| 4,649,543 A | 3/1987 | Levine |
| 5,185,711 A | 2/1993 | Hattori |
| 5,282,207 A | 1/1994 | Jurkevich et al. |
| 5,537,428 A * | 7/1996 | Larsson et al. ............ 714/758 |
| 5,668,880 A | 9/1997 | Alajajian |
| 5,742,599 A | 4/1998 | Lin et al. |

(Continued)

OTHER PUBLICATIONS

Komisarczuk, P. et al; "End-to-End Protocol Performance in ATM/Satellite Interconnected LANs"; 1993; IEE Conference Publication; pp. 87-91.*

(Continued)

*Primary Examiner*—Seema S. Rao
*Assistant Examiner*—Robert C. Scheibel, Jr.
(74) *Attorney, Agent, or Firm*—James Creighton Wray

(57) ABSTRACT

The transmission of ATM, Internet, and satellite communications is unified through international standardized protocol embedment. Global and Local performance optimization are achieved through the combination of combinatorial, dynamic, and probabilistic programming. A simultaneous domino effect of bandwidth conservation, efficiency enhancement, reliability improvement, traffic congestion prevention, delay minimization, and speed multiplication are realized for any digital communication system, particular in Internet. With three levels of error coding in ATM cells, the loss cell recovery and bit integrity are preserved. From its mathematical roots, new combinatorial sets are systematically generated, and applications of the sets are identified. Among the applications, optimal sequences can be produced for multi-user and multi-function communication system designs. Optimality is in terms of maximum possible number of sequences with given sequence length and sequence characteristics. The results are unique and theoretically proven. By serial and parallel concatenation of error codecs, reliability of multimedia transmission can be satisfied to any desirable level. As a part of the unified transmission scheme, the acquisition and synchronization method of cascading sequences exhibits significant improvement in correlation properties and detection probabilities. A method of using block designs is demonstrated to derive, to generate, and to construct low-density parity check block codes and threshold decodable convolutional codes. An efficiency evaluation method is formulated for the combination operation of ATM, Internet, and satellites.

7 Claims, 21 Drawing Sheets

U.S. PATENT DOCUMENTS

| | | | |
|---|---|---|---|
| 5,864,554 | A | 1/1999 | Rostoker et al. |
| 5,886,989 | A | 3/1999 | Evans et al. |
| 6,349,138 | B1 | 2/2002 | Doshi et al. |
| 6,601,208 | B2 | 7/2003 | Wu |

OTHER PUBLICATIONS

Ramseier, S. et al; "ATM Over Satellite: Analysis of ATM QOS Parameters"; Feb. 1995; IEEE; IEEE International Conference on Communications; pp. 1562-1566.*

Akyildiz, Ian et al; "Satellite ATM Networks: A Survey"; Jul. 1997; IEEE Communications Magazine; pp. 30-43.*

Kota, Sastri et al; "Satellite ATM Network Architectural Considerations and TCP/IP Performance"; Sep. 1997; Proceedings of the 3rd Ka Band Utizization Conference.*

Sun, Z. et al; "Implementation of ATM via Satellite for B-ISDN"; 1995; IEE Conference Publication; pp. 137-142.*

Miller, Gregory, et al; "Reliable End-to-End Communication in the Tactical ATM Environment"; Aug. 1996; IEEE; MILCOM'96; pp. 144-150.*

J.N.Pelton & W.W.Wu; *The Challenge of 21st Century Satellite Communicaations: INTELSAT Enters the Second Millenium*; IEEE Journal on Selected Areas in Communications, vol. SAC-5, No. 4; May 1987; pp. 571-591.

Perillan and Wu; *Digital satellite Services and Network Architecture*; IEEE International Communications Conference Proceedings; vol. 1; 8 pgs.; 1987.

Wu and Tudge; *Values of ISDN Attributes*; IEEE/IEICE Global Communications Conference Record; vol. 3 of 3; 6 pgs.; Tokyo, Japan; 1987.

Wu; *Optimum Random Multiple Access Sequence Generation*; Presentation Script presented at George Mason University, Fairfax, VA; 95 pgs.; Apr. 18, 1988.

Naderi and Wu; *Advanced Stellite Concepts for Future Generation VSAT Networks*; IEEE Communications Magazine, vol. 26, No. 9; pp. 13-22; Sep. 1988.

Wu; *International Communications Satellite Systems*; Paper presented at Advanced Modulation and Coding Technology Conference, NASA Lewis Research Center, Houston, TX; 12 pgs.; Jun. 21-22, 1989.

Wu; *Packetized Satellite Communications*; Paper published in the Proceedings of the First International Synposium on Signals, Systems, and Electronics; 8 pgs. Sep. 1989.

Sinha et al.; *Trends in Satellite Communications Technology, Techniques, and Applications*; International Journal of Satellite Communications, vol. 8, pp. 283-294; 1990.

Wu and Knab; *Communications Satellite Technology and Srevices for the 1990's*; Published in the Journal of the IEEE; pp. 8-1 through8-6; 1992.

Christopher and Wu; *A Low Cost Satellite Communication Concept*; Published in the Journal of the IEEE; pp. 8-29 through 8-36; 1992.

Wu; *Error Coding, Loss Cell Recovery, Multiple Access, and Security in ATM*; Published in the Proceedings of the IEEE Conference on Circuits and Systems; 30 pgs.; 1996.

Wu and Pritchard; *Satellite Communications*; Published in the Proceedings of the IEEE; 43 pgs.; 1997.

* cited by examiner

| | | | | | | | |
|---|---|---|---|---|---|---|---|
| $i_0$ | $i_1$ | $i_2$ | $i_3$ | $i_4$ | $i_5$ | $i_6$ | $i_7$ |
| $i_8$ | | | | | | | $i_{15}$ |
| $i_{16}$ | | | | | | | $i_{23}$ |
| $i_{24}$ | | | | | | | $i_{31}$ |
| $i_{32}$ | | | | | | | $i_{39}$ |
| $i_{40}$ | | | | | | | $i_{47}$ |
| $i_{48}$ | $i_{49}$ | $i_{50}$ | $i_{51}$ | $i_{52}$ | $i_{53}$ | $i_{54}$ | $i_{55}$ |
| $t_0$ | $t_1$ | $t_2$ | $t_3$ | $t_4$ | $t_5$ | $t_6$ | $t_7$ |
| $i_{56}$ | $i_{57}$ | $i_{58}$ | $i_{59}$ | $i_{60}$ | $i_{61}$ | $i_{62}$ | $i_{63}$ |
| $i_{64}$ | | | | | | | $i_{71}$ |
| $i_{72}$ | | | | | | | $i_{79}$ |
| $i_{80}$ | | | | | | | $i_{87}$ |
| $i_{88}$ | | | | | | | $i_{95}$ |
| $i_{96}$ | | | | | | | $i_{103}$ |
| $i_{104}$ | $i_{105}$ | $i_{106}$ | $i_{107}$ | $i_{108}$ | $i_{109}$ | $i_{110}$ | $i_{111}$ |
| $t_8$ | $t_9$ | $t_{10}$ | $t_{11}$ | $t_{12}$ | $t_{13}$ | $t_{14}$ | $t_{15}$ |

Figure 15A

| $i_{112}$ | $i_{113}$ | $i_{114}$ | $i_{115}$ | $i_{116}$ | $i_{117}$ | $i_{118}$ | $i_{119}$ |
|---|---|---|---|---|---|---|---|
| $i_{120}$ | | | | | | | $i_{127}$ |
| $i_{128}$ | | | | | | | $i_{135}$ |
| $i_{136}$ | | | | | | | $i_{143}$ |
| $i_{144}$ | | | | | | | $i_{151}$ |
| $i_{152}$ | | | | | | | $i_{159}$ |
| $i_{160}$ | $i_{161}$ | $i_{162}$ | $i_{163}$ | $i_{164}$ | $i_{165}$ | $i_{166}$ | $i_{167}$ |
| $t_{16}$ | $t_{17}$ | $t_{18}$ | $t_{19}$ | $t_{20}$ | $t_{21}$ | $t_{22}$ | $t_{23}$ |
| $i_{168}$ | $i_{169}$ | $i_{170}$ | $i_{171}$ | $i_{172}$ | $i_{173}$ | $i_{174}$ | $i_{175}$ |
| $i_{176}$ | | | | | | | $i_{183}$ |
| $i_{184}$ | | | | | | | $i_{191}$ |
| $i_{192}$ | | | | | | | $i_{199}$ |
| $i_{200}$ | | | | | | | $i_{207}$ |
| $i_{208}$ | | | | | | | $i_{215}$ |
| $i_{216}$ | | | | | | | $i_{223}$ |
| $t_{24}$ | $t_{25}$ | $t_{26}$ | $t_{27}$ | $t_{28}$ | $t_{29}$ | $t_{30}$ | $t_{31}$ |

Figure 15B

| $i_{224}$ | $i_{225}$ | $i_{226}$ | $i_{227}$ | $i_{228}$ | $i_{229}$ | $i_{230}$ | $i_{231}$ |
|---|---|---|---|---|---|---|---|
| $i_{232}$ | | | | | | | $i_{239}$ |
| $i_{240}$ | | | | | | | $i_{247}$ |
| $i_{248}$ | | | | | | | $i_{255}$ |
| $i_{256}$ | | | | | | | $i_{263}$ |
| $i_{264}$ | | | | | | | $i_{271}$ |
| $i_{272}$ | $i_{273}$ | $i_{274}$ | $i_{275}$ | $i_{276}$ | $i_{277}$ | $i_{278}$ | $i_{279}$ |
| $t_{32}$ | $t_{33}$ | $t_{34}$ | $t_{35}$ | $t_{36}$ | $t_{37}$ | $t_{38}$ | $t_{39}$ |
| $i_{280}$ | $i_{281}$ | $i_{282}$ | $i_{283}$ | $i_{284}$ | $i_{285}$ | $i_{286}$ | $i_{287}$ |
| $i_{288}$ | | | | | | | $i_{295}$ |
| $i_{296}$ | | | | | | | $i_{303}$ |
| $i_{304}$ | | | | | | | $i_{311}$ |
| $i_{312}$ | | | | | | | $i_{319}$ |
| $i_{340}$ | | | | | | | $i_{347}$ |
| $i_{348}$ | | | | | | | $i_{355}$ |
| $t_{40}$ | $t_{41}$ | $t_{42}$ | $t_{43}$ | $t_{44}$ | $t_{45}$ | $t_{46}$ | $t_{47}$ |

Figure 15C

| $i_0$ | $i_1$ | $i_2$ | $i_3$ | $i_4$ | $i_5$ | $i_6$ | $i_7$ |
|---|---|---|---|---|---|---|---|
| $i_8$ | | | | | | | $i_{15}$ |
| $i_{16}$ | | | | | | | $i_{23}$ |
| $i_{24}$ | | | | | | | $i_{31}$ |
| $i_{32}$ | | | | | | | $i_{39}$ |
| $i_{40}$ | | | | | | | $i_{47}$ |
| $i_{48}$ | $i_{49}$ | $i_{50}$ | $i_{51}$ | $i_{52}$ | $i_{53}$ | $i_{54}$ | $i_{55}$ |
| $i_{56}$ | $i_{57}$ | $i_{58}$ | $i_{59}$ | $i_{60}$ | $i_{61}$ | $i_{62}$ | $i_{63}$ |
| $i_{64}$ | | | | | | | $i_{71}$ |
| $i_{72}$ | | | | | | | $i_{79}$ |
| $i_{80}$ | | | | | | | $i_{87}$ |
| $i_{88}$ | | | | | | | $i_{95}$ |
| $i_{96}$ | | | | | | | $i_{103}$ |
| $i_{104}$ | $i_{105}$ | $i_{106}$ | $i_{107}$ | $i_{108}$ | $i_{109}$ | $i_{110}$ | $i_{111}$ |

| $k_0$ | $k_1$ | $k_2$ | $k_3$ | $k_4$ | $k_5$ | $k_6$ | $k_7$ |
|---|---|---|---|---|---|---|---|
| $k_8$ | $k_9$ | $k_{10}$ | $k_{11}$ | $k_{12}$ | $k_{13}$ | $k_{14}$ | $k_{15}$ |

Figure 16A

|     |     |     |     |     |     |     |     |
| --- | --- | --- | --- | --- | --- | --- | --- |
| $i_{112}$ | $i_{113}$ | $i_{114}$ | $i_{115}$ | $i_{116}$ | $i_{117}$ | $i_{118}$ | $i_{119}$ |
| $i_{120}$ | | | | | | | $i_{127}$ |
| $i_{128}$ | | | | | | | $i_{135}$ |
| $i_{136}$ | | | | | | | $i_{143}$ |
| $i_{144}$ | | | | | | | $i_{151}$ |
| $i_{152}$ | | | | | | | $i_{159}$ |
| $i_{160}$ | $i_{161}$ | $i_{162}$ | $i_{163}$ | $i_{164}$ | $i_{165}$ | $i_{166}$ | $i_{167}$ |
| $i_{168}$ | $i_{169}$ | $i_{170}$ | $i_{171}$ | $i_{172}$ | $i_{173}$ | $i_{174}$ | $i_{175}$ |
| $i_{176}$ | | | | | | | $i_{183}$ |
| $i_{184}$ | | | | | | | $i_{191}$ |
| $i_{192}$ | | | | | | | $i_{199}$ |
| $i_{200}$ | | | | | | | $i_{207}$ |
| $i_{208}$ | | | | | | | $i_{215}$ |
| $i_{216}$ | | | | | | | $i_{223}$ |

| | | | | | | | |
| --- | --- | --- | --- | --- | --- | --- | --- |
| $k_{16}$ | $k_{17}$ | $k_{18}$ | $k_{19}$ | $k_{20}$ | $k_{21}$ | $k_{22}$ | $t_{23}$ |
| $k_{24}$ | $k_{25}$ | $k_{26}$ | $k_{27}$ | $k_{28}$ | $k_{29}$ | $k_{30}$ | $k_{31}$ |

Figure 16B

| $i_{224}$ | $i_{225}$ | $i_{226}$ | $i_{227}$ | $i_{228}$ | $i_{229}$ | $i_{230}$ | $i_{231}$ |
|---|---|---|---|---|---|---|---|
| $i_{232}$ | | | | | | | $i_{239}$ |
| $i_{240}$ | | | | | | | $i_{247}$ |
| $i_{248}$ | | | | | | | $i_{255}$ |
| $i_{256}$ | | | | | | | $i_{263}$ |
| $i_{264}$ | | | | | | | $i_{271}$ |
| $i_{272}$ | $i_{273}$ | $i_{274}$ | $i_{275}$ | $i_{276}$ | $i_{277}$ | $i_{278}$ | $i_{279}$ |
| $i_{280}$ | $i_{281}$ | $i_{282}$ | $i_{283}$ | $i_{284}$ | $i_{285}$ | $i_{286}$ | $i_{287}$ |
| $i_{288}$ | | | | | | | $i_{295}$ |
| $i_{296}$ | | | | | | | $i_{303}$ |
| $i_{304}$ | | | | | | | $i_{311}$ |
| $i_{312}$ | | | | | | | $i_{319}$ |
| $i_{340}$ | | | | | | | $i_{347}$ |
| $i_{348}$ | | | | | | | $i_{355}$ |

| $k_{32}$ | $k_{33}$ | $k_{34}$ | $k_{35}$ | $k_{36}$ | $k_{37}$ | $k_{38}$ | $k_{39}$ |
|---|---|---|---|---|---|---|---|
| $k_{40}$ | $k_{41}$ | $k_{42}$ | $k_{43}$ | $k_{44}$ | $k_{45}$ | $k_{46}$ | $k_{47}$ |

| | 78 | | | | | | 79 |
|---|---|---|---|---|---|---|---|
| 3 | 6 | 7 | 4 | 1 | 14 | 8 | 2 |
| 9 | 13 | 11 | 5 | 15 | 22 | 10 | 5 |
| 16 | 17 | 12 | 19 | 23 | 24 | 13 | 11 |
| 20 | 18 | 26 | 27 | 25 | 27 | 19 | 18 |
| 21 | 32 | 34 | 29 | 28 | 33 | 26 | 22 |
| 35 | 40 | 36 | 32 | 34 | 40 | 30 | 23 |
| 43 | 42 | 39 | 38 | 41 | 44 | 31 | 37 |

| | | 80 | | | | 81 | |
|---|---|---|---|---|---|---|---|
| 3 | 6 | 7 | 4 | 1 | 14 | 8 | 2 |
| 9 | 13 | 11 | 5 | 15 | 22 | 10 | 5 |
| 16 | 17 | 12 | 19 | 23 | 24 | 13 | 11 |
| 20 | 18 | 26 | 27 | 25 | 27 | 19 | 18 |
| 21 | 32 | 34 | 29 | 28 | 33 | 26 | 22 |
| 35 | 40 | 36 | 32 | 34 | 40 | 30 | 23 |
| 43 | 42 | 39 | 38 | 41 | 44 | 31 | 37 |

|←——— $D_3 = 4$ ———→|

ERROR CODING IN ASYNCHRONOUS TRANSFER MODE, INTERNET AND SATELLITES

This application is a continuation-in-part of U.S. application Ser. No. 09/391,900, filed Sep. 7, 1999 now abandoned, which is in turn a continuation-in-part of Ser. No. 08/679,364, filed Jul. 10, 1996 and now abandoned.

BACKGROUND OF THE INVENTION

A worldwide telecommunication revolution is in progress. This revolution is independent of transmission media, information nature, and transmission speed. A unified means of moving information is a necessity for Asynchronous Transfer Mode (ATM), Internet, and satellites. However, problems exist when such unification is attempted.

ATM has been envisioned as a universal basic multimedia network architecture, which includes Internet and satellites. Multimedia consists of a set of media attributes on a set of multiple values. The media attributes are: compression, computation, distribution, generation, management, presentation, processing, retrieval, storage and transmission. The multiple values include audio, data, graphics, image, text, voice and video.

National and international standards have been established separately. These standards apply not only to commercial and civil telecommunications, but also to military telecommunications. These standards are used not only in satellite and space channels, but also in terrestrial microwave and fiber optical channels. These standards apply not only for fixed stations, but for mobile and personal communications also. The backbones to all multimedia transmissions are the protocols of ATM, Internet, and satellite communications.

Other error correction schemes for ATM networks have been proposed and used for testing in connection with ATM. Previous works have emphasized the nature of service type, loss compensation due to message over flow, specific encoder/decoder evaluation. Previous work also disregards the requirement of single cell transmission and/or de-emphasizes the functionality structure. All practical forward error correction schemes apply at the Physical Layer. The ATM information is treated as any stream of binary digits. The function of ATM cell structure is disregarded. As a consequence, the purpose and the foundation of ATM are ignored in currently available systems.

A subcommittee was formed within the ATM Forum Technical Committee to look into the performance aspect of ATM. In particular, five organizations have jointly contributed a document entitled "Necessity of an FEC Scheme for ATM Networks." The contribution discusses the benefits of and the need for an AAL-level forward error correction (FEC) scheme in ATM networks.

In the Technical Reference TR-NWT-001112, issued by Bell Communications Research, the code polynomial used to specify the ATM Header Error Check is: $H(x)=x^8+x^2+x+1$. In terms of error correction, this code can only correct a single error within 32 bits of cell header information. With the above code an ATM error-coding test was performed through a satellite channel. AT&T in the U.S., KDD in Japan, and Telestra in Australia jointly conducted the test. The above Header codec, or a modified version was used in the transmission link. During the tests, a significant problem was observed: when the satellite channel encounters more than a single error in the cell Header, the Header codec produced additional errors in the decoder output. This undesirable characteristic of the HEC led the testing team to turn off and by-pass the Header codec.

There is no sufficient current technology in combinatorial set generation, in the creation of multimedia unequal weighted convolutional codes, multimedia coding strategy, the method of conversion all convolutional codes to block codes without degrading any error correcting capability, the domino effect of significant Internet improvement, establishing a method of evaluation for combining efficiency, reliability, and delay in ATM cell collision control mechanism for random multiple access satellite communications, and in protocol standard compatibility within ATM, Internet, and satellites.

Separatability, efficiency, reliability, and protocol problems exist in ATM, Internet, and satellite communications. Additional problems arise when the three disciplines are combined. The present state of efficiency and reliability are poor, and protocols are generally incompatible. Reliability is defined in terms of either burst error statistics or random error rate. Efficiency is defined in terms of throughput and delay, which in turn reflect the state of congestion and channel utilization. The significant limitations and problems related to the fields of inventions are outlined below.

The lack of applicable combinatorial sets—Previous work has linked optimal solutions in telecommunication with combinatorial difference sets. Unfortunately, two problems exist: for applications such as ATM code derivation and random multiple access sequence generation, the known methods of sets, which derived from projective geometry, cannot be applied. The number of sets derivable from projective geometry is severely limited for most applications.

Network and throughput problems—Even with a network of multiple spacecraft, multiple antenna beam hopping, and onboard processing, at any orbiting level, satellites with ATM and Internet are fundamentally not compatible, because satellite networks cannot provide the originally conceived ATM and Internet environment, multiple path fast packet switching. Even with ATM and Internet switches, routers, and a switching center installed onboard, satellites cannot obtain the flexibility envisioned by ATM and Internet. Existing or planned satellite systems cannot handle as large a number of users as the present and future Internet with ATM protocols. The existing signaling formats in either ATM or Internet and those used in satellite are not compatible. The delays in multiple hopped satellite links are not acceptable to ATM, and the Internet world. The error detection scheme used in the Internet is a very inefficient and costly way to use satellite channel. The present speed of Internet is slow in comparison to wideband satellite transponders. In addition, ATM, Internet protocols are not compatible with satellite transmission protocols.

Protocol and reliability problems—There is no provision for retransmission in IP. That is why, even in the absence of heavy user traffic, different logon times have been experienced. This is due to either noise or interference in the transmission channel, and the IP is continuously discarding the Header when errors occur in IP. There are three types of ARQ: Stop and Wait, Go Back-N, and Select Repeat. The codes used in all ARQ schemes have been referred to as CRC (Cyclic Redundancy Code). The code generator polynomials degrees from 4, 7, 8, 12, 16, 24, and 32 have been standardized by the International Telecommunications Union—Technical (ITU-T). TCP assigns sequence numbers to each transmitted data block, and expects a positive acknowledgment from the Transport Layer from a receiver. If an acknowledgment is not received in a timely manner, the entire block is retransmitted. This retransmission protocol is a variation of the Select Repeat—ARQ. When a transmission channel is noisy, all transmission schemes based on ARQ become inefficient.

Present Internet, based on the protocols of TCP/IP, has not been able to provide high reliability and efficiency. If a feedback channel is available, repeated transmission decreases efficiency. If a feedback channel is not available, one takes a big chance at the receiving end. Furthermore, for some transmissions in real time when errors occur, it is not always feasible to stop in the middle of a transmission and request for retransmission over a satellite link.

Delay and speed problems—Error detection and retransmission has been introduced in ATM, Internet, and satellites. When a transmission channel is either noisy or interference prone, repeated transmission increases, which causes either excessive delay, or the channel breaks down due to excessive re-transmission. Thus error detection and retransmission schemes are undesirable in a noisy environment such as wireless.

In satellite communications, particularly with Geosynchronous orbiting satellites, the round trip path delay is a well-known troublesome phenomenon. That is why echo canceller was developed for speech over the satellite link. The present transmission speed of the Internet is too slow to be efficiently using satellite transponder capacities. The Network Working Group established by the Internet Society, which is related to IETF, addresses the issue of enhancing TCP over satellite channels. The Group consists of organizations like NASA/Glenn Research Center, Nortel, USC, UC Berkeley, JPL, and Ohio University. IP Multicast Initiative has looked into TCP/IP issues with respect to satellites. TCP Over Satellite (TCPSAT) has been chartered, and the Internet Protocol over Satellite (IPoS) Working Group has been formed. The performance optimization of Internet protocols via satellite has been supported by European Space Agency and studied at the University of Aberdeen. These and other references indicate that the problems exist and have been identified. A large amount of effort has been devoted and directed to window size scaling, slow-start modification, time stamping, fast retransmit and recovery, and selective acknowledgement. Some TCP performance enhancement have been observed, but the basic structure of error mechanism in TCP/IP is untouched. Thus far, no organization has provided or suggested any concrete fundamental solutions.

Limitations and problems of known sequences—Almost all CDMA networks are implemented with linear feedback shift registers (LFSR) with modulo-2 adders over the binary field, GF (2). For any m stage LFSR the number of such generators, which can generate a maximum binary sequence length of $2^m-1=n$, is $N=E(n)/m$. Where $E(n)$ is the Euler Function of n, or the number of integers less than n that are relatively prime to m. Thus for a given n, the number of LFSR stages, the number of direct sequences (DS), gold sequences (GS), or pseudo noise (PN) sequences generators is a direct function of the Euler Function.

Unfortunately $E(n)$ is limited for a very small number of odd m. For a large value of $E(n)$, the period or length of the sequence becomes long and thus inefficient. On the other hand, for most CDMA applications, the ability of accommodating a large number of users is a must. The number of users is directly related to the number of sequence generators. In some designs this relationship is one to one. As an example, for m=15, the sequence length is 32,767 and there exist only 42 generators.

By multiplication of two equal m degree minimal polynomials of related roots, the cross-correlation of a pair of sequences generated by the two minimal polynomials are known and bounded. Such sequences, referred as Gold Code or Gold Sequences (GS), have been suggested for spread spectrum applications. GS has $2^m+1$ different number of sequences and the period of the sequences are $2^m-1$. Although the correlation property of the sequences is known, the distance property among the sequences is not.

For DS, PN, or GS the limitations for the desired applications are failures to provide a large number of sequence generators, and the inability to shorten the sequence length in the detection processes. When designing for the military, such inefficiency may be tolerable and justifiable for extremely high reliability. It is neither cost effective, nor efficient when a system or a product is designed to compete in the commercial world market. For multi-user transmission, synchronization needs to be established frequently. The long length of DS or PN makes the system operation very inefficient. Separate arrangements for synchronization may be used, with DS or PN used for messages only, but such an arrangement is a waste from a system optimization viewpoint. The desired solution is a sequence, which can be used for synchronization, user identification, and secured message carrying all at the same time.

Problems of existing non-binary sequences—Normally, powerful non-binary code words such as Reed Solomon (RS) should be ideal for CDMA, FH, and/or non-Aloha random multiple access (RMA) applications. In fact, prior to this invention, RS code words were the best solution. The problems of RS code words are: a. For the same number of symbols, the RS code words are orders of magnitude longer than the sequence obtainable by the method of this invention. b. Few extremely low rate RS codes exist.

Limitation of orthogonal signaling—Orthogonal signaling can eliminate the interference problem, but the signaling set is too small to be usable for large number of accessing users. Once the distance property of the sequences is defined this way, all the existing error correcting code words based on either Hamming or Lee distance become useless in such applications.

The confinement and limitation of error coding in ATM—For the ATM header, it is a single error correction block code. For this code, when a transmission channel encounters more than a single error in the cell header, the header decoder produces additional errors at the decoder output. The result is that the error corrector becomes an error generator. This phenomenon exhibits a very undesirable characteristic in any information transmission. For the scheme of two dimensional encoding proposed by the ATM Forum subcommittee, the delay in decoding is excessive and the format does not match with the exact number digits in the information field of an ATM cell. In addition, there is no safe guard for a loss cell recovery mechanism. When error coding is confined within the ATM cell switching structure, it becomes a very difficult task.

The ATM Forum Recommendation identifies the difficulty of error coding in ATM. The recommended two-dimensional coding scheme can only protect the information part of the ATM cell, but not its header. The consequences can be that high fidelity messages may either end at a wrong destination, or no destination at all. Improving information quality on cell basis is important, but more important is the ability to transport a cell reliably regardless the quality of a message. But this is also a difficult task, and the ATM Forum has not addressed any solution.

The Limitation of Block Codes—All protocols in ATM, Internet, and satellite communications are block structured. Standards make all the protocol structures rigid. Few block codes can meet the strict requirements of the standards particular at short code block lengths. Because the error correcting capability of block codes is proportional to the code block lengths. On the other hand, convolutional codes are more powerful in terms of error correcting capability even at very short code length. Unfortunately, convolutional codes rely on memory to encode and decode. That is, convolutional codes cannot have the independent block structure as required by all the protocols.

The "impossibility" of construct block codes from convolutional codes—Block codes are known to encode and decode with independent code words with block structure. Convolutional codes are known to encode and decode with continuing dependent coded digits. That is, memory exists and is required in convolutional encoding and decoding. At shorter length, convolutional codes have more error correction capability. But, all protocols are block structured and few block codes can solve the coding problems particular at short length protocols. From theory to practice, it is "impossible" to optimally convert a convolutional code to a block code.

The non-existence of multimedia unequally weighted convolutional codes—In multimedia, the significance of the values of the media attributes is different. The efficiency and reliability requirements are different for voice, video, and data transmission. To conserve bandwidth, source coding is applied and data compression is used. The consequence of either source coding or data compression is that some digits are more significant than others. If error coding is applied indiscriminately, it is inefficient, unreliable, or wasteful. In multimedia, the most significant digits need to be highly error protected, and the least significant digits are sufficient to be modestly error protected. A few unequal error protection block codes are available, but their use is limited. For the large class of powerful convolutional codes, the method of producing such code with unequal error protection is not available.

The problems of standards and their compatibility—In the telecommunications industry, standards dominate product acceptability. If a new scheme does not meet the standards, the scheme at best remains as a patent. At present, the protocol standards for ATM, Internet, and satellite communications are all different and not compatible.

Wireless Problems—Wireless transmission channels are characterized with more errors and interference than transmission with wires. Wireless standards come from IEEE 802.11 and are limited to physical layer and the common medium access control of wireless LAN. For wireless Internet, the Internet Engineering Task Force (IETF) is working to establish standards for mobile internetworking through Internet Protocol version 6 (IPv6). For satellite communications, both ITU-T and ITU-R issue international standards for both "fixed" and mobile satellite services. For international digital satellite communications, the series of INTELSAT'S SSOG (Satellite Systems Operations Guides) are the industry's standards.

Modulation Standard Problem—The ITU-T latest standards for modulation is V.90, which is based on V.34, which in turn depends on V.42 standard for "error correcting" procedures. V.42 is misleading because the procedure does not correct any errors. The procedure is a basic error detection and retransmission scheme. The effective error correction may be achieved only after many retransmissions.

QoS Problems—For general optimization of system reliability, Tillman, Hwang, and Kuo provide a fundamental reference. Roosta addresses routing through a network with maximum reliability. Przygienda addresses the subject of Link State Routing with QoS in ATM LANs, in which, the optimization of ATM paths is taken into account the various QoS requirement, such as bandwidth and/or bit error rate. Computation of paths satisfying all QoS conditions has been identified as NP-complete and thus computational non-tractable. Further work is required in order to pre-compute the paths with guaranteed quality of services. The issues of very large number user networks and reliable routing capabilities are yet to be answered.

Needs exist for improved methods of transmission for ATM, Internet and satellite communications.

SUMMARY OF THE INVENTION

The present invention relates to the field of multimedia information transmission services in the areas of Asynchronous Transfer Mode (ATM), Internet, and satellite communications. In particular, it addresses the issues of optimal transmission techniques of multicasting, efficiency and reliability enhancement, and the operational compatibility in ATM, Internet, and satellites. Among the specific transmission techniques are protocol unification, multimedia error coding with respect to modulation, and optimal sequence generation method for universal transmission.

The merit of this invention not only advances the state-of-the-art separately in ATM, Internet and satellite communications, but also provides methods of compatibility and interoperability among the three disciplines. In addition to compatibility and operability, this invention demonstrates methods in which accessibility, efficiency and reliability can be significantly enhanced and improved in ATM/Internet/satellites.

An ATM Reference Structure consists of four layers and four planes. The planes consist of control, user, layer management, and plane management. While the higher layer concerns user applications and service aspects, the Adaptation Layer, the ATM Layer and the Physical Layer affect the quality, reliability, security, and efficiency of the information transmission through ATM networks. The fundamental element of ATM transmission is the ATM cell. The structure of an ATM cell includes a Routing Header, a Message Header and the information field. The Routing Header is required by the ATM switch fabric to route the incoming cells to the desired output. For routing, 10 bits are allocated for 1024 outputs. Four bits are designated for priority, 2 bits for discard priority, and 2 bits for delay priority. The discard priority is used when the number of cells simultaneously destined for the same output exceeds a threshold level. The delay priority is used to determine which of the outputs that a cell is placed in. The 3 bits cell Type field is used to differentiate internal signaling and test cells from data transport cells at the switch output. Cells arriving at a port and destined for a port processor are given a Routing Header with a payload Type of signaling and the address of the destination port. The cells are then fed into the switch fabric to be routed to the required output port, where they are detected and send to the port processor for action. Signaling cells destined for a node controller are inserted into the switch fabric by the port processor with VPI/VCI combination.

The Message Header consists of a Virtual Path Identifier (VPI), Virtual Channel Identifier (VCI), Payload Type (PT), Cell Loss Priority (CLP), and Header Error Check (HEC).

The VPI identifies a virtual path, which corresponds to a direct logical connection of similar traffic. Many virtual circuits can share such connection between two nodes simultaneously. A virtual path is assigned a predetermined route in a physical network. The bandwidth of a virtual path limits the number of virtual circuits it can carry. In simpler term, virtual path is a collection of grouped virtual circuits. VPI identifies to which Virtual Path a cell belongs. VCI identifies to which Virtual Circuit. This idea of VPI and VCI reduces the node processing cost, provides network flexibility, and enables simpler implementation.

There are two versions of ATM Message Header arrangements. With 4 bits of Generic Flow Control (GFC) and the use of ITU-T User Network Interface (UNI), the ATM Message has only 8 bits for VPI. When Network Node Interface (NNI) is used between a network output and line termination, there is no need for flow control, and the VPI extends to 12 bits. In both cases, the number of bits for VCI, HEC, and others are the same. The total number of bits in the Message Header is 5×8=40. The total number of bits in the Information Field is 48×8=384. Excluding the Routing Header, the total number of bits in an ATM standard cell is 40+384=424. The number of bits in the Routing Header is 3×8=24.

AAL provides for each service class the required quality of service (QoS). AAL is defined by ITU-T as a service enhancement mechanism provided by the ATM Layer to support the functions required by the next higher layer. Information received by the AAL from higher layers is segmented and formatted into ATM cell structure. Cells received by the AAL from the ATM layer are reassembled and de-formatted into the original information transmitted. Thus, the formation and the de-formation of the ATM cell information field are the functions or the responsibilities of the AAL, which consists of the Segmentation and Re-assembly (SAR) and the Convergence Sub-layer (CS).

SAR formats cell information from a higher layer, while CS concerns with the quality of service. Thus, CS is the primary interest for the present invention. The CS contains the further subdivided service-specific convergence sub-layer (SSCS), which calls for actions required to provide specific QoS.

Variable length messages from a higher layer arrive at the protocol data unit (PDU). Depending on the type of service, Convergence Sub-layer combines with PDU to form CS-PDU at the Service Access Point (SAP). Meanwhile, CS-SDU is formed at the Service Data Unit (SDU). Each portion of the CS-SDU then adds on a Header and a Trailer I. Next, the SAR receives information from CS-PDU and/or CS-SDU and formats them into segments. Depending on the type of services, the SAR segments or collects to form either SAR-PDU or SAR-SDU. Afterwards, they are further partitioned. After adding the corresponding Header and Trailer II for the SAR, a single 48 byte ATM cell information field is formed.

For receiving, the entire procedure is reversed. The main functions in receiving are stripping all the headers and trailers, re-assembly, identification, and routing all the segmented information. The SAR reconstructs the CS-PDU from the received cells and sends them to the CS. CS-PDU and SAR-PDU contain headers, which are not the ATM cell headers. The ATM cell Header is formulated in the ATM Layer and not in the ATM Adaptation Layer. Thus, both SAR and CS of the AAL concern only the formation and the reliability of the payload part, not the ATM header.

The Internet Engineering Task Force (IETF) considers AAL type 5 as an ATM over Internet standard for the TCP/IP protocols. AAL Type 5 is used for CS-PDU. The CS-PDU contains the information payload or the user data field, a PAD field for the purpose of aligning PDU to ATM cell numbers, a 2-byte reservation for the control field, a 2-byte length field to indicate the length of contents in the information field in terms of number of bytes, and a 4-byte CRC (Cyclic Redundancy Checks) for error detection and re-transmission. The first segment is the payload information, which can be from 0 to 65,535 bytes. Next, depending on the type of user-to-user interface, with or without payload, the number of symbols in PAD can be from 0 to 63 bytes. The CRC-32 is a standard error detection and re-transmission scheme.

For error coding, there exists 3-bit Routing Error Control (REC) in the Routing Header and 8-bit Header Error Control (HEC) in the Message Header. In general, cells arriving at a port and destined for a port processor are given a Routing Header with a payload Type of signaling and the address of the destination port. The cells are then fed into the switch fabric to be routed to the required output port, where they are detected and sent to the port processor for action. Signaling cells destined for a node controller are inserted into the switch fabric by the port processor.

The ATM Adaptation Layer (AAL) is sandwiched between the ATM Layer and the higher layers. Among other service functionality, the main purpose of the AAL is to provide required quality of service (QoS) for each service class. AAL is defined by ITU-T as a service enhancement mechanism provided by the ATM Layer to support the functions required by the next higher layer. AAL type 5 is established for variable speed with asynchronous transmission between a transmitter and a receiver. The Internet Engineering Task Force (IETF) standardizes AAL Type 5 for the TCP/IP protocols transmitted over ATM networks. The TCP/IP, in particular the IPv6, is standardized by IETF.

A coded AAL transmission format is a two dimensional array. The size of the array is 48×n, where n is the code word length and k is the number of information symbols in a (n, k, d) block code. "d" is the code minimum distance. "n−k" is the number of code parity check symbols. For an m-bit per symbol code, each element (x, y) in the array has m bits. The first two rows of the array are taken for the FEC Frame Header. The rest 46×k elements are the contents of the Service-Specific Convergence Sub-layer Service Data Unit (SSCS-SDU). The parity check symbol is n−k=48.

The key elements responsible for Internet transmission are the Internet Protocol (IP), Transmission Control Protocol (TCP), and the User Datagram Protocol (UDP). Each protocol has a header. The TCP Header consists of 32×5=160 bits. The IP Header consists of the same amount of bits, but the content partitions are different. The UDP Header has only 32×2=64 bits. In addition, other protocols also affect the service quality of Internet. The Internet Control Message Protocol (ICMP) is an integral part of IP that handles error and controls messages. Specifically, routers and hosts use ICMP to send abnormal conditions. In the ICMP there are six sub-protocols:

1. In the unreachable message sub-protocol, the usable portion of the protocol contains only 32 bits, half of it is devoted its own checksum.
2. For the ICMP message format there is a sub-protocol for echo request and echo reply. This sub-protocol has 64 bits and 16 bits are allocated to its checksum.
3. For time exceeding message, there is a 16 bit checksum out of a total of 32 bits.
4. For redirect message, the ICMP has a sub-protocol of 64 bits containing a 16 bit checksum. In this sub-protocol, 32 bits are allocated to a router IP address. Redirection consists of network direction, host direction, redirection for type-of-service and network, and redirection for type-of-service and host.

5. In ICMP there is Unreachable Error sub-protocol, which contains 16 bits each of MTU (Maximum Transmission Unit) and checksum. Depending on the type of network, MTU varies from 296 bytes for point-to-point, 1,500 bytes for Ethernet, and 65,535 bytes for Hyper-channel.

6. There is a 32 bit sub-protocol in ICMP devoted to Source Quench Error (SQE), which is generated by the UDP. The sub-protocol of SQE contains only 32 bits and half that number is allocated to its checksum.

The ICMP is initiated by TFTP (Trivial File Transfer Protocol), which is the corner stone communications between a client and a server. TFTP itself does not have a checksum for error protection like the other protocols or sub-protocols, but it contains in its format Error Message and ACK (acknowledgement). Basically, TFTP is a form of stop-and-wait error detection protocol scheme. In the TFTP there are 16 bits for ACK and another 16 bits for Error Number.

As a part of the IP Datagram, the Internet Group Management Protocol (IGMP) hosts in order to keep local routers apprised of their membership in multicast groups. IGMP consists of 64 bits segment for each Datagram. The format of the IGMP contains 32 bits of group address and another 16 bits checksum. The other partitions are for different versions of IGMP.

Concerning one-to-many and many-to-many user environments, the Internet Multicast Protocol (IMP) addresses the transmission issues, including broadcasting messages. IMP consists of the following two routing and transport protocols.

1. The mode, join-type, network tree building method, and tree type characterize the IMP routing protocol. The mode, either dense or sparse, refers to the receiver distribution in the network. The join-type can be either implicit or explicit. Implicitness implies that every user is a receiver by default. Explicitness indicates that users must send a join message to become a part of the tree. The tree building method can be either data-driven or a priori. The difference is that a tree is built when the first data appears, while a-priori refers to a tree building before any data is sent. The tree type can be either source-based or shared. The former means a unique tree for every group, pair source; the latter refers to one tree per group and shared by all the senders.

Among the IMP routing protocols are: Distance Vector Multicast Protocol (DVMRP), Multicast Open Shortest Path First (MOSPF), and the Protocol Independent Multicast (PIM). All three protocols are dense mode, data-driven, and source tree type. Both DVMRP and PIM are implicit, while MOSPF is explicit. The Core-Based Trees (CBT) protocol is sparse in mode, explicit in join-style, a priori in tree building, and shared in tree type.

2. A new set of transport protocols is required in IMP. A multicast transport protocol (MTP) is built upon a layer of a non-multicast protocol such as UDP. The functions of MTP are: sequencing, time stamping, feedback control, and congestion controls.

The Real-Time Transport Protocol (RTP) is a transport protocol designed to provide sequencing and time stamping for multimedia applications. It is primarily used for multicast applications. RTP works by first encapsulating any multi-media information into RTP packets before transmission. At the receiver RTP stores the data and routes it to the user application. RTP provides no reliability improvement over UDP.

Point-to-Point Protocol (PPP) is used when sending IP over a serial line. Each of the PPP frames contains a cyclic redundancy check (CRC) field to detect errors in the frame. This is done in accumulation for the frame check sequence (FCS). In addition to CRC, PPP provides a way to encapsulate IP Datagrams on a serial link, and to establish, configure, and test the data link connections. Error protection mechanisms in TCP utilize error detection and retransmission, or ARQ (Automatic Repeat Request). The IP is the heart of the Inter-network Layer, which does not provide any measure of link reliability. The only error protection mechanism in the IP is an error detection scheme for the protection of the IP header. At the receiving end, if an error is detected, the entire IP header and message are discarded. No current technology provides a solution.

As a part of wireless communications, the standardization effort of satellite communications has been the responsibilities of ITU (International Telecommunication Union). Under ITU-R (for radio communications), Recommendations on International Mobile Telecommunications-2000 (IMT-2000), the ITU-R M 818-1 and ITU_R M1167 set the standards for satellites. For international satellite communications, the series of INTELSAT (International Telecommunications Satellite Organization) Satellite Systems Operation Guide (SSOG) are the implementation standards. Series 307, 308 and 309 specified multiple access techniques, convolutional and long block codes for satellite links. Without the said invention, a satellite channel cannot be efficiently utilized for carry ATM and Internet traffic, and also it is impossible to improve the transmission delay effect as presently specified.

INTELSAT's SSOGs set the standards for protocols, efficiency, reliability for all international digital satellite communications. For reliability, the SSOG specifies both rate ½ and rate ¾ convolutional encoding, Viterbi decoding for the inner code, and a Reed-Solomon code for outer. For the convolutional encoding the basic code polynomial is, $$G_0(D)=1+D2+D3+D5+D6 \quad (1)$$

$$G_1(D)=1+D2+D3+D6 \quad (2)$$

The coding processing uses three encoders and three decoders interleavingly connected in parallel for the purpose of burst error protection. The basic Reed-Solomon polynomial is:

$$\prod_{i=120}^{119+2t}(x-\alpha^i) \quad (3)$$

Where $\alpha$ is a primitive root of $1+x+x^2+x^7+x^8$, and $t=7-10$.

Efficient use of a communication channel can be achieved through multiple access techniques, which are classified in terms of time (T), frequency (F) and space (S) as resources. Each resource can be divided for orthogonal multiplexing. Each orthogonal access scheme can be designed for demand assignment. TF, SF, ST, or TSF variations can be obtained by combinations of the resources.

From F or TF, spread spectrum (SS) systems can be obtained. SS includes frequency hopping (FH) as a subclass. Code division multiple access (CDMA) based systems, such as WCDMA, CDMA 2000 and TD-SCDMA, can be obtained through either FH or sequence methods. Such scheme has the effect of radio frequency spectrum spreading. Spread spectrum has the effect of minimizing interference and is advantageous for a large number of users with infrequent messages. ALOHA or ALOHA derived systems are time based, so are time spreading (T-SPD), and polling or token ring methods. Carrier sensing multiple access (CSMA) is a variation of ALOHA based on time. CSMA has become a standard in many data communication networks.

Most CDMA has been implemented through Direct Sequence (DS) or Pseudo-random Noise (PN) Sequence. These sequences can be generated by a set of irreducible polynomials. These sequences have the characteristics of a maximum sequence length period; therefore they also have been referred to as maximum length sequences. CDMA can also be obtained by using low rate error correcting codes, including orthogonal codes with Hadamard or waveform transformation, or wider bandwidth modulation schemes. Since these are add-on methods to enhance the effect of SS in CDMA from DS or PN, they are not the fundamental issues.

Normally, to improve transmission channel performance through error coding is a relative simple task. Unfortunately, it is an almost an impossible task to change the structure of the ATM, global satellite communications and Internet format for the sake of introducing error correcting codes, because the protocol standards are the result of years of effort with international consensus and compromises. The suggestion of any modification on the standards is not a feasible solution.

With the global situation being what it is, constraints have been placed on the selection and the use of existing codes, and the known designs of compatible codecs. Unfortunately, after 50 years of research and development no simple solution exists. In the past and at present, all communication systems, whether for satellites or fiber optical cables, are designed with separate boxes for specific functions. The functions of synchronization, station identification, common channel multiple user accessing, encryption/decryption, error correction, and spectrum spreading are physically separated within a system. The present invention changes this notion of communications design through a specifically derived set of sequences. That is, all of the above mentioned functions can be obtained cost effectively, efficiently, and simultaneously, and maximum possible numbers of user accessibility can be obtained with improved reliability.

The present invention's characteristics are summarized as follows:

The fundamental characteristics of ATM, Internet, and satellite communications are well established. With minimum impact on standard changes, this invention advances the state-of-the-art by introducing the method of protocol imbedding and interfacing: from data to Internet first, next to ATM levels, and finally to merge with satellite transmission structures.

The detail mechanization are characterized by first confronting the three key Internet transmission protocols: IP, TCP, and UDP. Attached with respective headers and other related protocols, controlling and routing means are required to form the information as the payload part of a ATM message cell. With the ATM cell header, sync word and requirement for modulation locking, a traffic burst is formed. When the traffic burst is attached with a reference burst, a basic frame is constructed for satellite communications.

Two levels of optimization are characterized for an overall transmission scheme: the network level is characterized through the combination of combinatorial, dynamic, and probabilistic programming. The link level is characterized by error coding with each link.

A 16-step algorithm of this invention is characterized as follows:

To derive useful new sets, an algorithm is constructed consisting of five steps: the first step is constructing two related finite fields, the second step establishes even degreed primitive polynomials, the third step identifies the non-zero elements in Step 1 in terms of a primitive element in Step 2; from Steps 1–3, the fourth step forms two sets of integers for enumeration from the given formulation; from the key equation, calculations are performed on the exponents, Step 5 obtains the set elements from the set of exponents from Step 4.

Computer programs in set generation and testing are established consisting of input formation through non-binary primitive polynomials, set generation algorithms, set validity checking procedures, and set tabulation.

From the previous steps, the non-binary sequence generation method is characterized by the following 7-step procedures:

Step 6. Form the rows of a basic matrix with set elements derived from Step 5.

Step 7. Construction of an extended basic matrix also from elements in Step 5.

Step 8. Determine a resource (frequency and time) matrix.

Step 9. From Steps 6–8, a B-matrix can be constructed.

Step 10. Use the method of permutation to obtain additional sub-matrices.

Step 11. From Step 10 to provide additional matrices through ordering.

Step 12. Collect all the rows from Steps 8–11. The result is the set of non-binary sequences with specified characteristics as described below in Equations (4)–(8), which have been theoretically proved and computer simulation verified.

$$[\text{Number of symbols}] = n^3 \quad (4)$$

$$[\text{Number of time divisions}] = n \quad (5)$$

$$[\text{Number of frequency divisions}] = n^2 \quad (6)$$

$$[\text{Sequence minimum distance d}] = n-1 \quad (7)$$

$$[\text{Number of sequences}] = n^2(n^2+n+1) \quad (8)$$

The purpose of Steps 9–11 is to maximize the number of non-binary sequences. Each sequence, or each pair of sequences can represent a station in satellite communications or a client in Internet multicast.

The next step is the generation of primitive polynomials p(n) based on n. With the understanding of operation in the finite non-binary field, the number of these polynomials will not exceed $E(n^2-1)/2m$, where E(.) is the Euler Function because the number of these primitive polynomials will determine the number of set of sequences. There exist a number of ways to generate primitive polynomials.

This procedure is summarized in FIG. 3. From the elements of a {D}-set, two matrices $[W]_0$ and $[W]_1$ with size $(n^2-1) \times n$ and $(n+1) \times n$ can be formed, where n is the binary sequence length. The rows of $[W]_0$ consist of the elements of a {D} and its equivalent sets. The elements in the rows of $[W]_1$ are so constructed that the first element in its 0th row cannot be any difference modulo $(n^2-1)$ among the set of residues. A set of row matrices are then defined in terms of the row representation of time-frequency matrix M, whose elements are the code symbols. If the set of rows of M is substituted, a set of matrices $B_j$ is obtained. Next, a set of matrices A[k] (Latin Squares) is constructed and each A[k] is used as an ordering transformation on the set of $B_j$'s to obtain a set of matrices U(j, k). The rows of $B_j$, U(j, k), and the f rows of M constitute the set of desired sequences. The algorithm is described in steps Equations (12)–(22).

This class of sequences derived from even degree of non-binary primitive polynomials with two finite fields. The results can be generalized for $d \neq n-1$.

Let $r \geq 1$ be an integer, and n be any prime power as before. Then the characteristics:

[Number of symbols]=$n^{2r+1}$

[Number of time divisions]=$n^r$

[The number of frequency divisions]=$n^{r+1}$ (9)

[Sequence minimum distance]=$n^r - n^{r-1}$ (10)

[Number of sequences] = $\dfrac{n^{2r+1}(n^{r+1}-1)}{n-1} + n^{r+1}$ (11)

When r=1 in the parameter characteristics of (9)–(11) become the parameter characteristics of (4)–(8).

Binary sequence transformation from any non-binary sequence derived from the above system depend on the existence of a finite field and consisting of the following steps: the relation among degrees of a primitive polynomial, the number of bits per symbol, and sequence length, recognizing an existing binary error correcting code, linking number of non-binary information symbol to the number of bits per symbol, and utilizing an existing symbol error code.

The applications of Projective difference-set have been previously established. The same applications are carried over for the new combinatorial sets derived from the above item.

Conventional frame synchronization uses either Barker, PN, Gold. Maury-Styles, Bent-function sequences, or new difference-set sequences as derived from above. The method is characterized by cascading short sequences of all the above types.

By applying the basic probabilistic principle that the product of either false or misdetection probabilities is less than any its component probability, the result is much improved performance. For equal length component, it is the power of the single component probability.

By error coding of the above items, the correlation properties and detection probabilities, can be further improved due to extended sequence length and number of sequences.

The ATM cell header encoding is characterized by vertically column-wise encoding. Because the ATM message header is a unit during transmission and it is not separable.

This convolutional code constraint length is characterized by matching exactly the ATM Information Field contents.

When three consecutive payloads can be accumulated before decoding, the recommended code can further improve transmission efficiency.

The three recommended forward error-correcting codes uniquely solve all the error problems in the Internet transmission protocols.

In order to prevent ATM cell loss either due to transmission, interference, or buffer over flow, two extremely high rate codes handle both random and burst error phenomena.

Multimedia is characterized by voice, video, and data. Multimedia reliability requires multiple coding strategies. The recommended method handles not only multimedia sources, but also multiple different transmission speeds.

To determine a network or system performance, the methods of evaluation and/or measure are significant. The proposed measure is characterized by the essential parameters affect on the efficiency performance in ATM, Internet, and satellite networks.

One of the merits of this invention is meeting present and/or future international standards. In the event of future standards change, alternatives and provisions are provided.

The simultaneous domino effect is characterized by the single and simple solution providing maximum impact on the desirable consequences.

When wireless transmission with random multiple accessing, message collision is an undesirable characteristic, the new solutions above can eliminate such collisions.

For both analog voice and video when digitized, the weights of the digits are not equal. This is due to the characteristics of the quantization and PCM conversion. If each of these source bits are treated equally during transmission, the difference between the most significant and the least significant bits are ignored. This part of the invention provides a constructive procedure to generate unequal error protection convolutional codes that can be easily threshold decodable.

For large error correcting encoder and decoders, implementation can be excessive. A means of reducing the number of shift registers and the number of stages per register is provided.

These and further and other objects and features of the invention are apparent in the disclosure, which includes the above and ongoing written specification, with the drawings.

BRIEF DESCRIPTION OF THE DRAWINGS

FIGS. 15A, 15B, and 15C show the ATM single cell information field encoding method with SCIFC-1 code.

FIGS. 16A, 16B, and 16C show the second single cell Information Field encoding method with SCIFC-2.

FIGS. 17A and 17B show two specific examples of how multimedia weighted error-correcting codes can be generated.

DETAILED DESCRIPTION OF THE PREFERRED EMBODIMENTS

Figure 1:
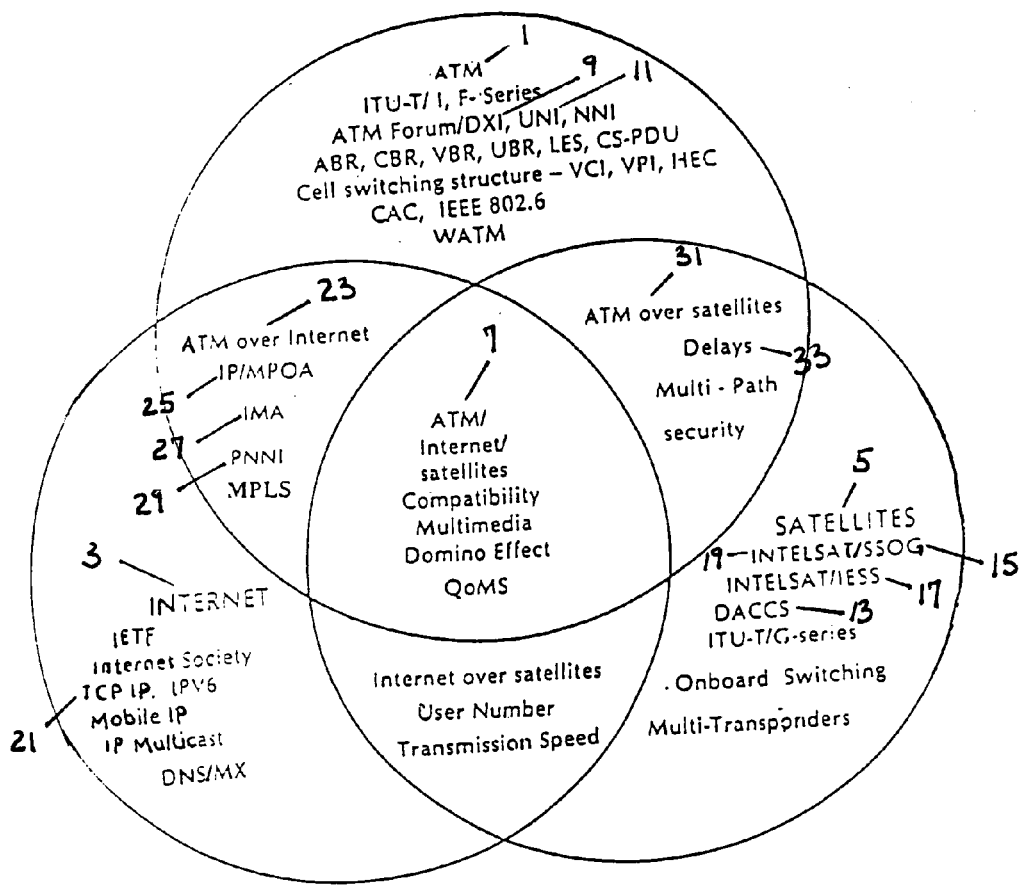
FIG. 1 is a diagram that identifies the sphere of this invention.

FIG. 1 identifies the sphere of the present invention. It shows the inter-relation among three separate disciplines, Asynchronous Transfer Mode (ATM) 1, Internet 3 and satellite 5. The present invention is not limited to the intersection 7 of ATM, Internet, and satellites. In particular, methods are advanced in each discipline regarding the quality of multimedia services (QoMS). Quality includes: reliability in terms of bit error rate improvement, efficiency in terms of throughput enhancement, increasing transmission channel utilization in terms of elimination retransmission. All schemes are international protocol standards compatible.

In ATM 1, DXI 9 denotes digital exchange interface, U(N)NI 11 denotes user (network)/network interface, CS denotes a convergence sublayer, PDU denotes a protocol data unit, VC(P)I denotes a virtual channel (path) identifier, CAC denotes connection admission control and HEC denotes header error control. In satellites 5, DACCS 13 denotes digital access cross-connect system, SSOG 15 denotes satellite systems operations guideline, and IESS 17 denotes INTELSAT 19 earth station standards. In Internet 3, TCP/IP 21 denotes transmission control protocol/Internet protocol and DNS/MX denotes domain name system mail exchange. In ATM over Internet 23, MPOA 25 denotes multi-protocol over ATM, IMA 27 denotes Inverse multiplexing for ATM, and PNNI 29 denotes private network-to-network interface. For ATM over satellites 31, delays 33 refer to propagation delay and delays due to retransmission. Other aspects include LANE, a LAN emulation, and MCPA, a multiprotocol over ATM.

All protocols have layered architecture in common. Each layer has its separate functions. For ATM, the cell switching structure established by the ATM Forum and ITU (International Telecommunications Union) serves as the core of the basic transmission unit. For Internet, the transmission protocols are standardized by the IETF (Internet Engineering Task Force), the Internet Society in terms of contributions in the form of RFC (Request for Comment). There are 15 protocols responsible for Internet transmission. For satellites, the standards are ITU-RR endorsed Intelsat SSOG and the IMT-2000. Wireless standards come from ITU-T, SG VIII and IEEE 802.11 for the common medium access control of wireless LAN. For the wireless Internet, the IETF is working toward establishing standards for mobile Internet through IPv6. Some pair-wise standardization efforts between ATM-Internet, Internet-satellites, ATM-satellites have been in progress. But, none has been addressed for all three.

Figure 2:
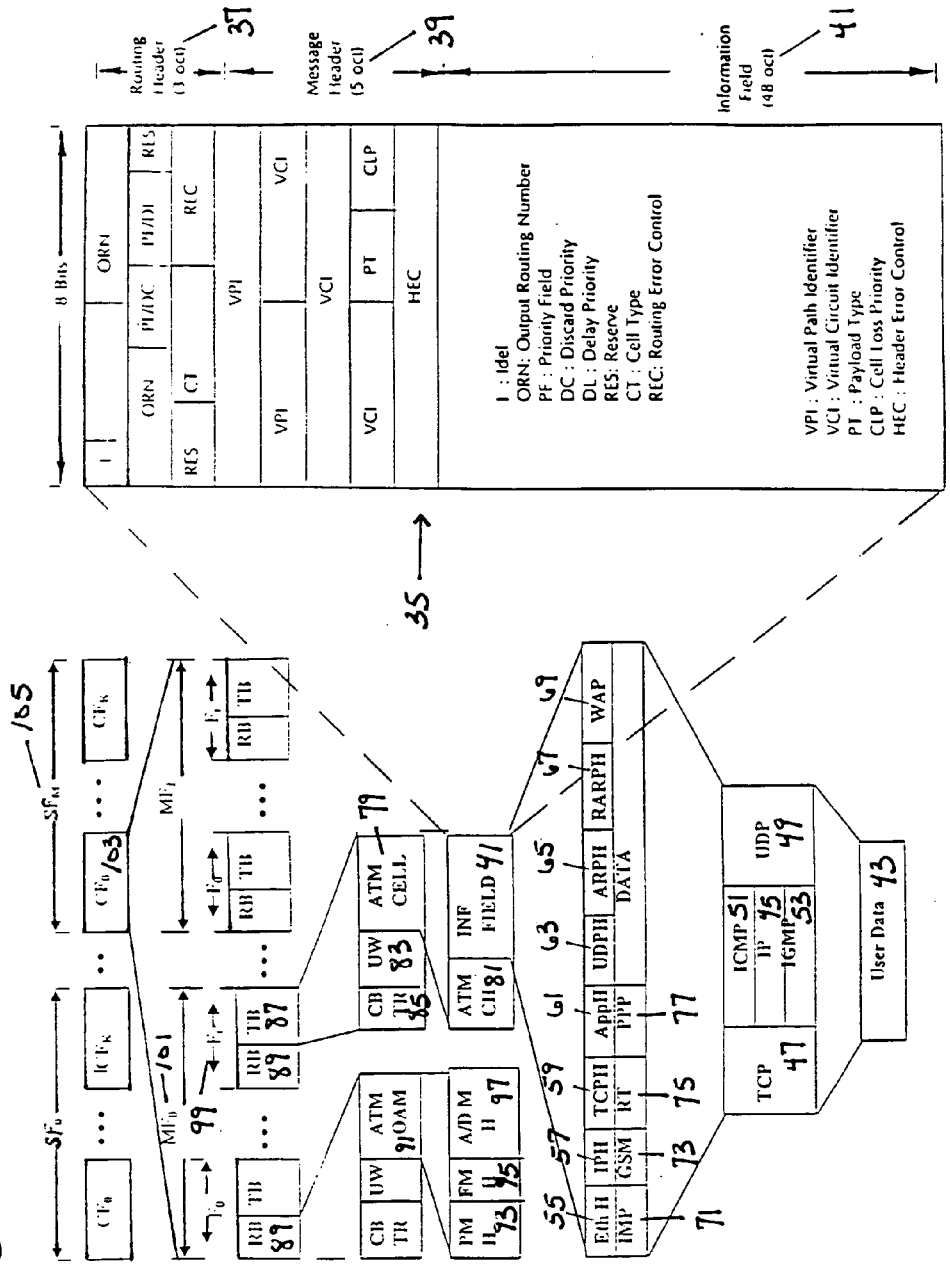
FIG. 2 is a diagram that shows how signaling can be optimally arranged in ATM, Internet, and satellite communications.

FIG. 2 shows how signaling can be optimally arranged in ATM, Internet, and satellite communications. The fundamental information transmission mechanism in ATM is a Switching Structure 35 as shown in FIG. 2, which consists of three basic segments: a Routing Header 37 that is the network operator's responsibility, a Message Header 39 that is the preamble portion of every ATM unit cell, and an Information Field 41 is the message part of the unit cell. The Switching Structure 35 consists of 24 bits routing and 40 bits message headers, and 384 bits information field for messages. User data 43 is actually first introduced through protocols of Internet Transmission Protocols before reaching ATM segments. Afterwards, the data carried by ATM cells form the basic frame structure for satellite transmission.

FIG. 2 begins with User Data 43, which feeds into IP (Internet Protocol) 45, TCP (Transmission Control Protocol) 47, and UDP (User Datagram Protocol) 49. IP interfaces with ICMP (Internet Control Message Protocol) 51 and IGMP (Internet Group Management Protocol) 53. User Data 43 can also feed into IP through ICMP 51. This combines the transport and network layers.

The next level up identifies all the protocols and their headers:

Eth H 55 is the Ethernet Header, IPH 57 is the IP Header, TCPH 59 is the TCP Header, AppH 61 is the Application Header, UDPH 63 is the UDP Header, ARPH 65 is the Address Resolution Header, RARPH 67 is the Reverse ARP Header, WAP 69 is the Wireless Application Protocol, IMP 71 is the Internet Multicast Protocol, GSM 73 is the Global Standards for Mobile, RTP 75 is Round Trip Protocol, and PPP 77 is Point to Point Protocol. All these protocols and headers become the payload in the information field 41 as a part of an ATM cell 35. Combined with a cell header (ATM CH) 81 they form an ATM Cell 79 as shown. When the ATM Cell 79 is attached with UW (Unique Word) 83 and CBTR (Carrier and Bit Timing Recovery) 85, they form a TB (Traffic Burst) 87 in the satellite transmission hierarchy. A RF (Reference Burst) 89 of the satellite signaling part consists of the same CBTR 85 and UW 83 as in the Traffic Burst 87. In addition, it has ATM Operation and Maintenance (OAM) 91, which is the responsibility of ATM network operators.

OAM 91 consists of three cell structures: a Performance Management (PM) 93, Fault Management (FM) 95, and Activation/Deactivation Management (A/D M) 97. Each cell structure has a cell header field H of 40 bits. The combination of RB 89 and TB 87 forms a basic frame F 99. Accumulation of i number of basic frames makes a multi-frame (MF) 101. After j number of MFs 101 combine, a Control Frame (CF) 103 is formed. After k number of CFs 103 combine a Super Frame (SF) 105 is formed. There can be m number of Super Frames 105 before the satellite frame structure terminates.

In the Intelsat Global TDMA Digital Satellite Network, there exists i=16 consecutive basic frames F 99 consisting of an MF 101, during which each earth station in the network is addressed. The sequence of the addresses is completed over j=32 Multi-Frames 101, or a Control Frame 103. There are k=16 CF 103 in each Super Frame 105, in which the coordination of burst plan changes and the calculation of satellite coordinates for acquisition and synchronization takes place; m=1 in the Intelsat TDMA system.

For efficient satellite operation, the present invention simplifies the Reference Burst 89 contents and reduces the number Reference Bursts 89. In addition, long block codes at a Physical Layer are replaced by powerful block structured, short constraint length convolutional codes. For more reliable message transmission through satellites, coded ATM cells and coded Internet protocols are embedded into the satellite frame hierarchy.

A satellite transmission burst formation depends on the availabilities of a transponder and earth station, single or multi-destination transmission, burst plan, burst assignment, and preamble attachment.

Figure 3:
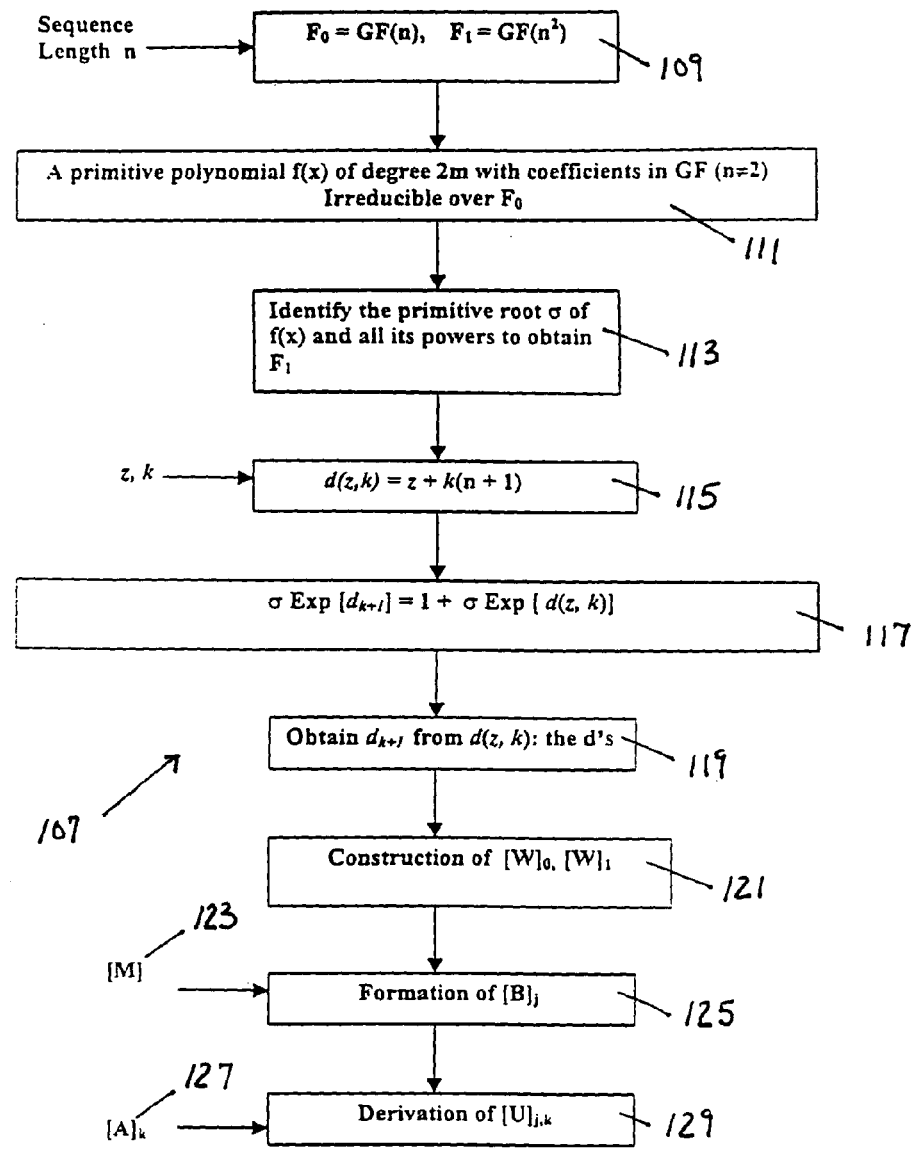
FIG. 3 is the non-binary multi-user and multi purpose sequence generation algorithm, which includes a 5-steps combinatorial set generation procedure and 7-steps of matrix construction, transformation, permutation, and ordering.

FIG. 3 is a non-binary multi-user and multi purpose sequence generation algorithm 107, which includes a 5-steps combinatorial set generation procedure (109, 111, 113, 115, 117 and 119) and 7-steps of matrix construction 121, transformation 121, 123, 125, permutation 127, and ordering 129.

There are two types of useful sets: additive sets $\{A\}$ and difference sets $\{D\}$. $\{D\}$s can be obtained through algebraic and/or combinatorial methods. Due to highly structured set properties, the amount of available useful sets is severely limited. The useful sets include the well known $\{D_P\}$, derived from Projective Geometry (PG). As a consequence, applications based on the available sets are also severely limited. The present invention formulates set generation steps in order to construct a large amount of new sets from Euclidean Geometry (EG). The advantage of $\{D_E\}$, derived from EG, is the fact that useful set parameters of $\{D_E\}$ are not available from $\{D_P\}$. When $\{D_P\}$ fails to be useful, $\{D_E\}$ prevails. There is no known related method to generate $\{D_E\}$.

The elements of a set in EG are derived from roots of a non-binary primitive polynomial with even degree 2m, where m is any none-zero positive integer. There exist two finite fields: $F_0 = GF(n)$ and $F_1 = GF(n^2)$ 109. With $\{D_E\} = \{D\}$, the generation algorithm composed of the five three steps of the sequence generation procedure:

Step 1: For any positive integer m, prime number p, which determines the number of elements n in the set $\{D\}$. Then two related finite fields could be constructed in terms of n as follows 109:

$$F_0 = GF(n=p^m), \text{with n elements} \quad (12)$$

$$F_1 = GF(n^2=p^{2m}), \text{with } n^2 \text{ elements} \quad (13)$$

Step 2: Let a set of primitive polynomials over GF(p) for $p \neq 2$, and with even degrees as 111:

$$f(x) = x^{2m} + f_{2m-1}x^{2m-1} + \ldots + f_1x + f_0 \quad (14)$$

Such polynomials are described in terms of finite field elements, or coefficients of the polynomial p, a non-zero positive integer m, sequence length n, or $n^2 = p^{2m}$, factorization of $n^2-1$, and the number of such polynomials with given p, m, as well as n. The number of polynomials is $\phi(n^2-1)/2m$, where $\phi(n^2-1)$ is the Euler's function, which defines the number less than or equal and relatively prime to $n^2-1$.

Step 3: Given a prime or prime power $n=p^m$, then $p^{2m}=n^2$. Identify the non-zero elements of the corresponding finite field $F_1$ in terms of the primitive element $\sigma$ satisfying a primitive polynomial $f_0(\sigma)$ of degree 2m 113.

$$f(\sigma) = \sigma^{2m} + f_{2m-1}\sigma^{2m-1} + \ldots + f_1\sigma + f_0 = 0 \quad (15)$$

where the coefficients, $f_i$ is in $GF(p^m)$, $i=0, 1, \ldots, 2m-1$

Step 4: With the selected integer n form two sets of integers $z=1, 2, \ldots, n$; and $k=0, 1, \ldots, n-2$. Each value of z provides a $\{D\}$. Choose a value of z and run through the k values in 115:

$$d(z,k) = z + k(n+1) \quad (16)$$

The elements of $\{D\}$ are the set of exponents $d_{k+1}$ 119, i.e. (Exp) of $\sigma$. The exponents can be obtained from d(z, k) through the element $\sigma$ as 117:

$$\sigma \text{Exp}(d_{k+1}) = 1 + \sigma \text{Exp}[d(z,k)] \quad (17)$$

for $k=0, 1, \ldots, n-2$.

Step 5: With $d_0=0$ and from Step 2 for the other $d_{k+1}$'s, the complete set is:

$$\{D\} = \{d_0, d_1, d_2, \ldots, d_{n-1}\} \quad (18)$$

Step 6: Let $[W]_0$ be a matrix of $n^2-1$ rows, $w_0, w_1, \ldots, w_{n-2}$. The first row consists of the complete set of elements of the derived set 121:

$$w_0 = [d_0, d_1, d_2, \ldots, d_{n-1}] \quad (19)$$

The ith row of $[W]_0$ is, $$w_i = [d_0+i, d_1+i, \ldots, d_{n-1}+i] \bmod(n^2-1) \quad (20)$$

Where $i=1, 2, \ldots, n^2-2$.

Step 7: Construct the matrix $[W]_1$ with n+1 rows and n columns 121. The first, or the $0^{th}$ row of $[W]_1$ is:

$$[0(n+1), 1(n+1), \ldots, (n-2)(n+1), (n-1)(n+1)] \quad (21)$$

The ith row of $[W]_1$ is obtained by the addition of the value i' to each of the row element, except the last element, which always remains as $n^2-1$, with $i'=1, 2, \ldots, n$. Addition is modulo $(n^2-1)$.

Step 8: Let the frequency/time, or time/frequency matrix be M 123, with size $n^2 \times n$. The elements of M 123 are sequentially designated as before.

Step 9: By combination of the rows of $[W]_0$, $[W]_1$, and the rows of M 123, a set of $B_j$ matrices 125 can be constructed. Each row of either $[W]_0$ or $[W]_1$ produces a $B_j$ matrix 125. The column elements of every $B_j$ 125 correspond to the elements in M 123 with respect to a single element in each row of either $[W]_0$ or $[W]_1$. That is, $B_j$ 125 is formed from the jth row of $[W]$, and each column of $B_j$ 125 is obtained by the row elements of M 123, which corresponds to the specific element in the jth row.

Step 10: A method of systematic transposition uses a set of permutation matrices A[k] 127 obtained as follows: construction the set of $n \times n$ $[A]_k$s 127 is equivalent to the set of mutually orthogonal Latin Squares. A Latin square of order n is a square matrix of size $n \times n$ such that each row and column is a permutation of its row or column elements, which are represented by positive integers $0, 1, 2, \ldots n-1$. The characteristics of Latin Squares are well known in combinatorial mathematics. The number of orthogonal Latin Squares, and thus the number of $[A]_k$s 127 is a maximum of $n-1$. By using the Latin Squares as $[A]_k$s 127 in this step, the solution is optimum.

Step 11: From each $B_j$ 125 of Step 4 and each $[A]_k$ 127 of Step 5, a $[U]_{j,k}$ 129 is derived from an ordering transformation:

$$[U]_{j,k} = \{[B_j], [A]_k\} \quad (22)$$

with $j=0, 1, \ldots, (n^2+n-1)$, and $k=0, 1, \ldots, n-2$.

$T\{[B_j], [A]_k\}$ denotes that the column elements in each $B_j$ are rearranged so that their order of magnitude corresponds to the ordering of the elements in the corresponding column of $[A]_k$. This procedure applies to all columns in $B_j$ 125.

Step 12: The complete set of non-binary sequences consists of the rows of $B_j$ 125 (before the ordering transformation), the $n^2$ rows of M 123 and all the rows of $[U]_{j,k}$ 129 for all j and k.

For non-binary implementation, such as using frequency synthesizers, frequency dividers, delay units, the above twelve steps are sufficient. For binary implementation, the following four steps are necessary. Binary sequence transformation is a one-to-one mapping from any non-binary sequence to the corresponding binary sequence. The mapping procedure in general uses the existence of a finite field. It is known in finite mathematics that a non-binary finite field can be generated from a primitive polynomial and any primitive polynomial has a primitive root. The powers of the primitive root form the distinctive elements of the finite field. Each power of the primitive root has a unique representation in the binary field. Thus, each alphabet in the non-binary sequence can be transformed into a collection of binary digits. As a consequence, all the non-binary sequences obtained from Step 12 can be uniquely transformed into binary sequences.

Figure 4:
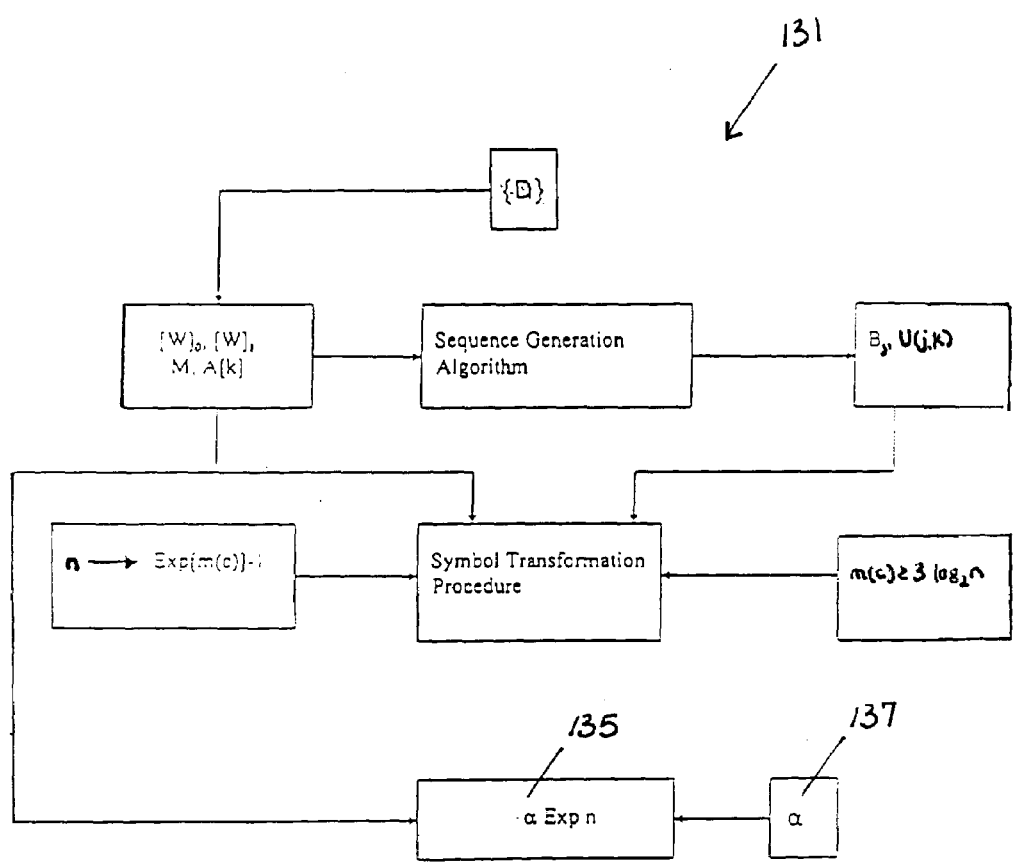
FIG. 4 is the four-step algorithm with finite field computation for converting the non-binary sequences derived from FIG. 3 to binary implementation.

FIG. 4 describes a 4-step algorithm 131 with finite field computation for converting non-binary sequences derived from FIG. 3 to binary implementation.

This method of transformation is described in steps as follows:

Step 13: From Step 8, [M]=$n^3$ 123, the alphabet or symbols are 0, 1, 2, ..., $n^3-1$. From a finite field GF($q^{m(c)}$), when q=2, and there are m(c) 133 bits per symbol, the field can be generated by a primitive polynomial of m(c) degree 133. Let the primitive root of this polynomial be denoted as $\alpha$ 137 and denote all powers of $\alpha$ as the alphabet, or the elements of the [M] matrix. That is, $$\alpha^0, \alpha^1, \alpha^2, \alpha^3, \ldots, \alpha \exp(n^3-1) \quad (23)$$

If the primitive polynomial is m(c) degree, then each power of $\alpha$ can be uniquely represented by m(c) binary digits. Therefore, the relation between m(c) and n is $$m(c) \geq 3 \log_2 n \quad (24)$$

Step 14: Once each non-binary symbol is transformed into the corresponding sequence of binary digits, any binary error correcting code, either convolutional or block, can then be applied.

Step 15: For a non-binary symbol error correcting code with K number of information symbols, of any minimum distance, the following relation can be established with respect to Step 1:

$$K=M=2^{m(c)} \quad (25)$$

Step 16: When K is determined from Step 15, and any error correction or detection capability in terms of minimum distance $d_m$, a non-binary symbol error correcting code length N can be determined as:

$$N=K+d_m-1 \quad (26)$$

Both Reed-Solomon block codes and/or non-binary character error correcting convolutional codes can be used in Step 16. Once a symbol or character error correcting code is identified, encoding and decoding algorithms are known. Steps 14, 15 and 16 depend on the existence of an error correcting code.

Figure 5:
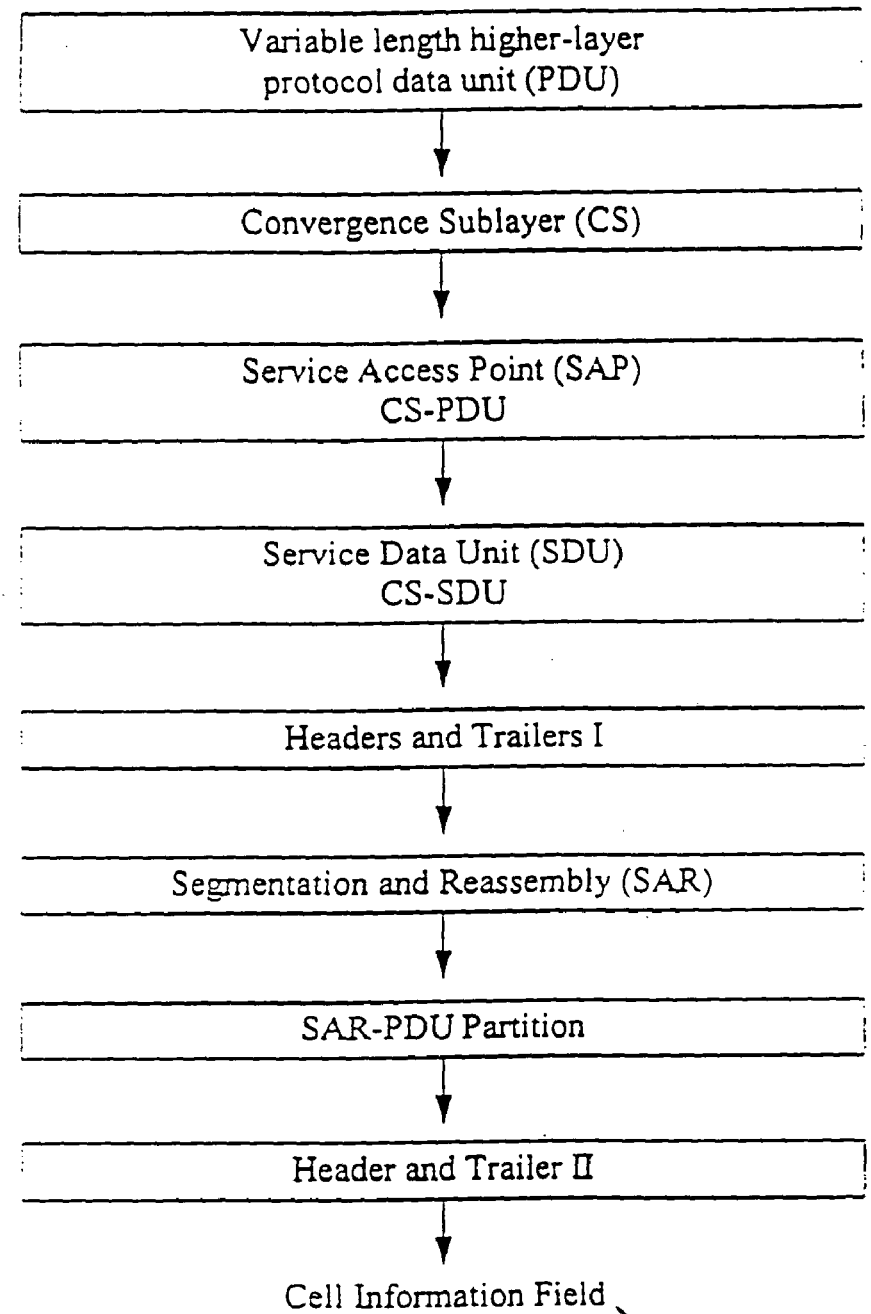
FIG. 5 is an outline of the formation of ATM message cell Information Field.

FIG. 5 outlines the formation of an ATM message cell information field 139.

Unique Word 83 in satellite communications refers to specific combination of binary digits for synchronization with good auto and cross correlation properties. This portion of the present invention advances the state-of-the-art by providing a systematic UW 83 generation procedure for any synchronization purposes. The procedure is described in the following:

Step 1: Let a UW 83 be of length N digits and N=$N_1+N_2+N_3+\ldots+N_\alpha$. The $N_i$'s need not be equal in length. If they are, N is divisible by an integer $\alpha$. Divided equal segments are denoted as: $N_1, N_2, N_3, \ldots N_\alpha$. Each segment $N_i$ has length N/$\alpha$.

Step 2: Each $N_i$ is a power of a prime q ($N_i=q^n$), where n is defined in Step 1 of the previous process.

Step 3: Let each segment of the UW, $N_i$, i=1,2,3, ..., $\alpha$ becomes the elements of [D] in as a result of Step 5 of the previous process in such way that there is a non-zero entry whenever the elements {D}={$d_0, d_1, d_2, \ldots, d_{n-1}$} exist. In the case of binary, the non-zero entries are the 1s, and 0 everywhere else.

Step 4: By the property of {D}, $d_0<d_1<d_2<\ldots<d_{n-1}$, construct the corresponding UW 83 segment based on [D] as follows: place non-zeros values with respect to [D] and zeros for values not in [D] up to the length N/$\alpha$.

$$UW_i = \begin{bmatrix} w_1, & w_2, & \ldots & \ldots & \ldots & \ldots & \ldots & \ldots & \ldots & \ldots & \ldots & \ldots & w_{Ni} \\ d_0, & 0, & 0, & 0 & d_i, & 0, & 0, & d_2, \ldots & , & 0, & d_{n-1}, & 0, & 0, \ldots, & 0 \end{bmatrix}$$

$\uparrow$                           $\uparrow$
1st digit                    $q^n$th digit Step 5: The final UW is the sum of all the $UW_i$'s.

Step 6: The same {D} can be reused to obtain all the $UW_i$'s. Or, different {D}'s can be used to generate different $UW_i$. The only requirement for different {D} is that Step 2 must be met.

Step 7: Binary or non-binary block coding can be applied to all the $UW_i$'s to further improve both the auto and cross correlation properties.

The UW 83 detection process is described in the following steps:

Step 1: Cascade all the $UW_i$s as a single UW of length N.

Step 2: The detector is wired in cascade in accordance with the order of the $UW_i$'s sequence.

Step 3: The ith detector is responsible for the detection of $UW_i$. There are a total $\alpha$ number of detectors.

Step 4: The output of each detector contributes to the final decision of the UW detection.

Step 5: In the most stringent case, the decision requires that all the detector output is present.

UW performance is described as follows:

1. The total false detection probability $P_F$ in the identical detectors case is the joint false detection probabilities from all the $UW_i$ detectors, for i=1 to $\alpha$.

$$P_F = [p_f(i)]^\alpha = \left[\left\{\sum_{j=0}^{t_E} N_i C_j / 2_i^N\right\}\right]^\alpha \quad (27)$$

Where $t_E$ is the number of tolerable error set in the detector. $N_i C_j$ is n combination j.

2. The total miss detection probability $P_m$ of the UW is also the product of the individual miss detection probabilities of the $UW_i$'s.

$$P_m = \left[\sum_{j=t_E-1}^{N_i} N_i C_j p^j (1-p)_i^{N-j}\right]^\alpha \quad (28)$$

Where p is the transmission channel error rate.

Since each component probability is less than unity, the products or powers of these component probabilities are much less than 1. The amount of both low false and miss detection probabilities are determined by a network or system designer as desired.

3. The auto-correlation function of each $UW_i$ is:

$$A_{ij} = \sum_{i=1}^{N_i} w_i w_{i+j} \quad (29)$$

With i+j taken modulo $N_i$.

4. The cross-correlation function between two different sequences $UW_y$ and $UW_z$ is, $$X_{Y,Z} = \sum_{y=1}^{N_i} w_y w_{y+z} \quad (30)$$

For optimal collision controlling of ATM Cells, Internet packets, and satellite frames, another application of the new sets derivable from Steps 1–5 can be used. The method is based on that a binary symbol incident matrix can always be established. The first row of the matrix is formed by the elements of the set as nonzero entries. The nonzero row positions are the values of the set elements. All other values not in the set are the zero positions in the row. For a set of parameters v, n, λ, the incident matrix consists of v positions in its rows. There are n nonzero entries in each row, and overlaps of the nonzero entries between any pair of rows in the matrix.

After the first row of the incident matrix is formed, the other rows in the matrix are formed by cyclic right shifts of the first row. Each shift produces a new row and there are v rows before it repeats itself. Thus, the incident matrix has v rows and v columns. In a frame length v of random multiple access scheme consists of either k ATM cells, k Internet packets, or k satellite frames, the number of overlapping of cells, packets, or frames can be controlled by the value of λ. In addition, the overlapping or collision locations can be controlled precisely by the rows of the incident matrix.

Assume the set elements are: $\{d_0=1, \ldots, d_1=i, \ldots d_j=j, \ldots d_k=k, \ldots\}$, Then, the first two rows of the incident matrix are formed as:

| 1 ... i ... j ... k ... | set values |
|---|---|
| 100 ... 10 ... 100 ... 1 ... | 1st row |
| 010 ... 01 ... 0100 ... 01 ... | 2nd row |

In this case, there are k=4 nonzero values occurring at 0, i, j, and k positions.

Among the newly generated set applications are:

a. Making the values of the set elements as the frequency allocation numbers.

b. Let the synchronization sequence length be the set parameter v. In a binary sync sequence the number of non-zero digits corresponds to the set parameter n. The non-zero positions correspond to the values of the set elements.

c. The crossbar connections are the λ parameter of the set. When λ=1, which indicates there is only a single connection between any pair of columns or rows in the incident matrix formed by the elements of the set.

d. The aliasing effect is minimized or eliminated by non-uniform sampling according to the elements of the set.

e. Place the locations of the antenna phase array or multi-beam elements in accordance with the elements of the set, the side lobe or interference can either be eliminated or minimized.

f. In addition to multiple accessing, the non-binary sequences or binary version obtained above is used for encryption and decryption.

g. Using the results of the above process, determine the error correcting capability, codes can be constructed from the elements of the new $\{D\}$s.

The following steps describe a system for multimedia unequally weighted convolutional code generation:

Step 1: From Step 5 the above process, $\{D\}=\{d_0, d_1, \ldots, d_{n-1}\}$, an array [A] can be formed as follows:

$$[A] = \begin{matrix} d_1 - d_0 & d_2 - d_1 & d_3 - d_2 & \ldots & v + d_0 - d_{n-1} \\ d_2 - d_0 & d_3 - d_1 & d_4 - d_2 & \ldots & v + d_1 - d_{n-1} \\ d_3 - d_0 & d_4 - d_1 & d_5 - d_2 & \ldots & v + d_2 - d_{n-1} \\ \vdots & \vdots & \vdots & \vdots & \vdots \\ d_{n-2} - d_0 & d_{n-1} - d_1 & d_{n-2} - d_2 & \ldots & v + d_{n-3} - d_{n-1} \\ d_{n-1} - d_0 & d_{n-2} - d_1 & d_{n-3} - d_2 & \ldots & v + d_{n-2} - d_{n-1} \end{matrix} \quad (31)$$

The entries of the array are obtained by successive additions of the entries in the first row. Taking the adjacent differences of the set elements forms the first row. The total number of columns in [A] is n.

Step 2: To construct any rate $k_0/(k_0+1)$ convolutional code with t-error correction, from Step 1 partition the columns of [A] into $k_0$ sections, with $k_0=n/2t$ and 2t number of columns per section.

Step 3: Locate the 2nd row of [A] and find the set of corresponding entries in each section such that the least of the maximum values is obtained simultaneously in the 2nd row. These numbers are the highest powers of the sub-generator polynomials.

$$[g^{(1)}(D), \ldots, g^{(ko)}(D)] = \text{min max[the column elements in } \{D\}] \quad (32)$$

Step 4: To derive a multimedia unequally weighted code, Step 2 and Step 3 can be used to correct $t_1$, $t_2$, and $t_i$ number of errors simultaneously. The key is to identify the columns corresponding to the $2t_1$ th, $2t_2$ th and $2t_i$ th rows in [A]. In the multimedia case, [A] is no longer equally partitioned.

Step 5: The overall code generator polynomial consists of three sub-generator polynomials with multiple error correcting capabilities of $t_1$, $t_2$, and $t_i$. From Step 4, the sub-generator of $t_1$ code is obtained by identifying the elements in the column corresponding to the $2t_1$ th row in [A]. The sub-generator of $t_2$ code is obtained by identifying the elements in the column corresponding to the $2t_2$ th row in [A]. The sub-generator of $t_i$ code is obtained by identifying the elements in the column corresponding to the $2t_i$ th row in [A]. All the elements in [A] are the differences of the elements in set $\{D\}$ as shown in the array.

Step 6: All the column elements in Step 5 are the exponents of the code polynomials in D-domain. Each nonzero term corresponds a tap connection from either encoder or decoder shift register. The sub-code tap positions are the exponent values in the column obtained from Step 5.

FIGS. 17A and 17B show two specific examples of how multimedia weighted error-correcting codes is generated.

The following simple example demonstrates the technique: FIG. 17A and FIG. 17B are identical set arrays. In FIG. 17A the two columns with dotted line around them are identified. The array is partitioned into two sections. From the left two columns with the number 6 (78), $D_1=2$, a single error protected digit is obtained. From the six columns on the right hand side, $D_2=6$, with 2, 5, 11, 18, and 22 (79), as codec connections, a three error correction capability is obtained.

With the two columns of elements (7,11,12) 80, and (8,10,13) 81, as shown in FIG. 4B, a rate 2/3, $D_3=4$, 2-error correction capability is obtained. This demonstrates the fact that from the same coding array, single, double, and triple error correction capabilities can be derived simultaneously.

The principle of selection of the columns, or the determination of the code structure, is that the sub-spans from the column squares cannot be overlapped simultaneously. Once the code generator polynomials are obtained from the above procedure, the design of the codes is known and straightforward.

Figure 14:
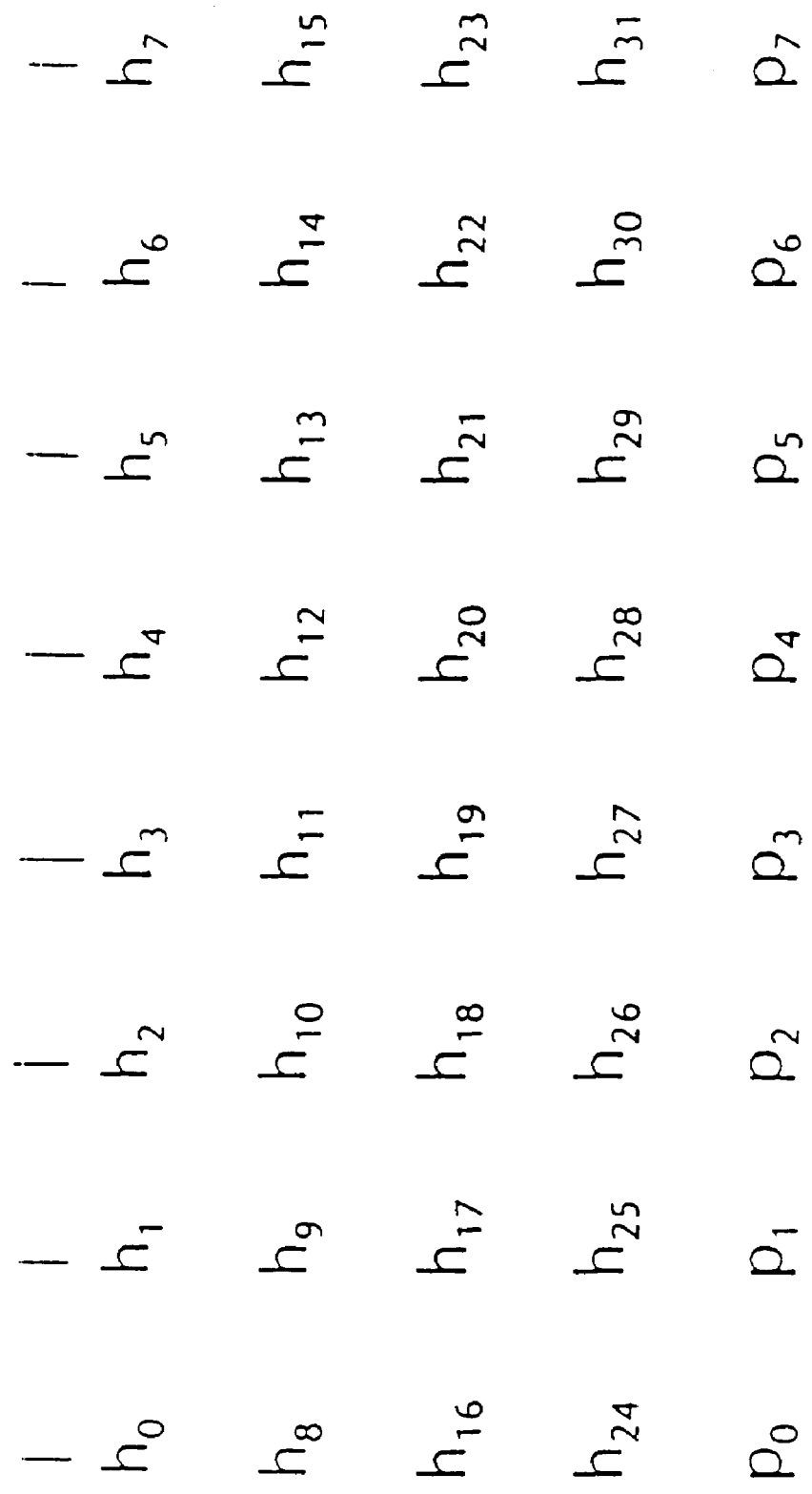
FIG. 14 shows the encoding process for the single cell transmission ATM header codec.

FIG. 14 shows an encoding process for the single cell transmission ATM header codec. An encoder takes every 4 bits column-wise into a single parity check bit. Although decoding header information accumulates row-wise or horizontally, the method decodes vertically in a cell header. There are eight columns in the header. Each column has 4 header information bits, which regenerate a single received parity bit for error location. The result is that for each cell 32 bit header information is encoded into 8 bit parity digits. The merit of such encoding is the fact that the overall format remains the same as the international standard without a single bit change. The 8-bit HEC space allocation is the same, only the code is different.

An ATM Single Cell Header Codec (SCHC) has total length of 40, which matches with total number of digits in the Header. The rate of the code is 4/5. The code can generally correct two errors in 40 bits. The coding arrangement is shown in FIG. 14, where the h's are contents in the Message Header, and the p's are the parity check digits. Header contents may write in horizontally, but coding is performed vertically. For every 4 bits of h, there is a corresponding check bit p. The code combined generator polynomial is:

$$G(SCHC)=1+x+x^2+x^3+x^4+x^5+x^6+x^7+x^8 \tag{33}$$

FIGS. 15A, 15B and 15C show an ATM single cell information field encoding method with SCIFC-1 code. Each Figure indicates how the message bits are encoded. FIG. 15A shows how two sections of the 56 bits are formatted to produce 16 bits of parity checks. Both FIGS. 15B and 15C are a continue scheme in order to complete the ATM information field of exactly 384 bits per information field per single ATM cell.

An ATM Single Cell Information Field Codec-1 (SCIFC-1) is described. With the exact number of digits in the Information Field, the example code has a length 384 with coding rate of 0.875, and minimum distance of 5 for single cell transmission and processing. The compatibility and encoding layout is shown in FIGS. 15A, 15B and 15C. FIG. 15A consists of the information parts and the corresponding parity parts. Where the i's are the contents of the Information Field, and the t's are the check digits as results of the coding. The sub-numbers of the i's and t's are precisely specified. Similarly, FIG. 15B and FIG. 15C are the continuation of the information field digits and the parity check digits to complete a single cell of 384 digits.

The 8 bit sequence of information is always maintained, because most software or hardware messages are conventionally grouped into either 8 bits per symbol, or 8 bits per byte. Encoding is also done vertically as shown. Within each column, every 7 information digits generate a check bit. This ATM single cell information field code is designated as SCIFC-1, and the corresponding code polynomial is:

$$G(SCIF-1)=1+x^{23}+x^{39}+x^{42},1+x^9+x^{22}+x^{43},1+x^{14}+ \\ x^{18}+x^{47},1+x+x^{12}+x^{37},1+x^{26}+x^{31}+x^{46},1+x^{24}+x^{30}+ \\ x^{32},1+x^{28}+x^{38}+x^{45} \tag{34}$$

The SCIFC-1 encoder consists of seven registers varying from 32-stages to the maximum of 47-stages. Two storage registers are required for input and output feeding. For the encoder a total 27 modulo-2 adders are needed. In decoding, a replica of the encoder is required. The basic SCIFC-1 decoder consists of multi-stage shift register connections to the syndrome circuits, error detection and correction circuits. The error calculation circuit consists of a set of basic 3-input adders, registers, and there are total 16 of them. In this decoder a 7-stage output register and seven modulo-2 adders are required for error corrections. Error corrections can also be made by set/reset the flip-flops of the shift-register.

FIGS. 16A, 16B and 16C show a second single cell Information Field encoding method with SCIFC-2. This method accumulates three code blocks in order to complete an information field per single ATM cell. FIG. 16A shows a first code block of 110 bits with the first 16 bits parity check digits. FIG. 16B shows a continuation of the coding process with a next 110 information bits and a second set of 16 bit parity digits. FIG. 16C shows a remaining 110 information bits and a third set of 16 bits parity checks.

An ATM Single Cell Information Field Codec-2 (SCIFC-2) is described. The second code for encoding of the Information Field with single cell is the code of length 128, rate 0.875, and minimum distance of 6. A benefit of this code is the fact that the code length is a multiple of the exact length of the Information Field. Because 128×3=384. The ATM cell coding arrangement by this code is shown in FIGS. 16A, 16B and 16C. FIG. 16A shows the first block encoding with 16 check digits from $k_0$ to $k_{15}$. Again, the i's are the information digits. FIG. 16B shows the second block of information digits with another 16 check digits from $k_{16}$ to $k_{31}$. FIG. 16C shows the last coded block in the Information Field with check digits from $k_{32}$ to $k_{47}$. It takes three blocks to complete all the information in the Information Field. This code is designated as SCIFC-2, and the code polynomial is:

$$G(ASCIFC-2)=1+x+x^2+x^7+x^{10}+x^{11}+x^{12}+x^{13}+x^{14}+x^{15} \tag{35}$$

The single cell information code (SCIFC-2) encoder contains a 15-stage shift register and nine modulo-2 adders. The functions of decoding for both error detection and error correction can be implemented with a 28×8 bits data storage, error detection, syndrome formation, parity checking and error location. Error location can be implemented with 16×16 Kbits ROM table. For high speed operation coset decoding technique is used. The syndrome register operates at ⅛ times the serial data speed. A syndrome sequence is formed, every time a block of 112 information bits is received. One bit of the syndrome stored in the address buffer corresponds to a parity check, and the remaining 14 bits of the syndrome data are used to assign the address of the coset table. The syndrome shift register consists of an address buffer and 15 multiple modulo-2 addition adders. The error locator circuit for the SCIFC-2 decoder is implemented with a multi-layer ROM, a comparator, and a buffer.

Figure 6:
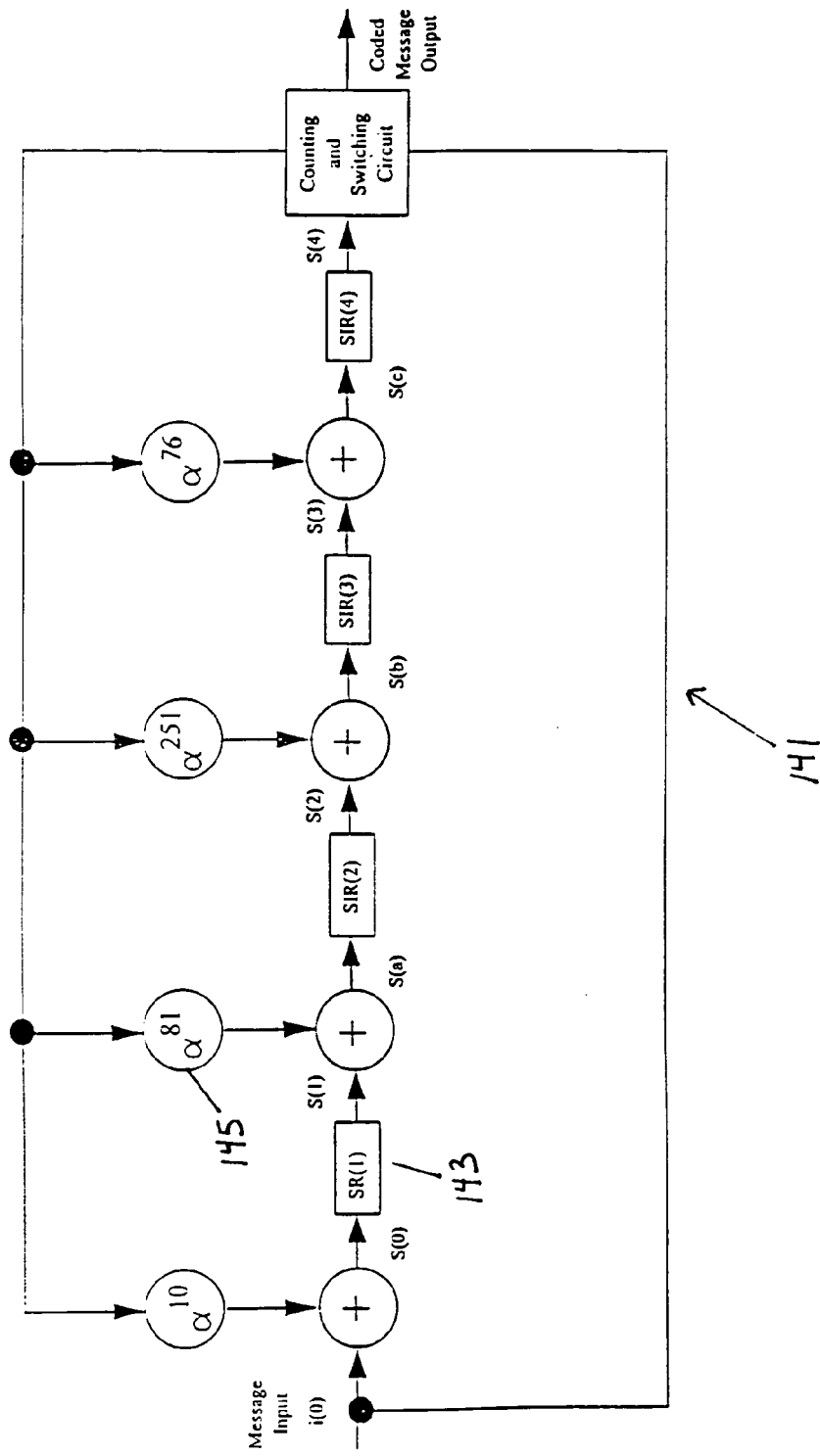
FIG. 6 is a block diagram of the MCIFC-1 encoder.

FIG. 6 shows a block diagram of an MCIFC-1 encoder 141. There are two non-binary symbol error correcting multiple cell information field codecs (MCIFC). Other than banks of shift registers 143, there are sets of finite field element modulo-2 adders 145.

Due to congestion at the cell processor, errors occur at the header, errors due to synchronization, cell loss in ATM, or packet dropping in Internet, and frame disappearance in satellites are expected phenomena. To provide a common solution for such recovery, a multiple unit encoding with a modified known symbol error correcting code. When information of five ATM cells, packets, or frames can be accumulatively transmitted, received, and processed, a non-binary symbol error correcting code with code length of n=255, m=8, d=5, R=0.985 is designed. The generator polynomial for the multiple cell Information Field is:

$$G(MCIFC-1) = \prod_{i=112}^{143} (x - \alpha^i) \quad (36)$$
$$= \alpha^{10} + \alpha^{81}x + \alpha^{251}x^2 + \alpha^{76}x^3 + x^4$$

$GF(2^8)$ is generated by the primitive polynomial $$p_1(x)=1+x^2+x^3+x^4+x^8 \quad (37)$$

where $\alpha$ is a primitive element

The encoder has eight independent signaling circuits. Each of the single shift register stage S/R (1), S/R (2), S/R (3) and S/R (4) 143 has 8 inputs and 8 outputs respectively. Four modulo-2 additions 145 are needed for each calculation. All the powers of the primitive element 147 $\alpha$, i.e. 10, 81, 251, 76, require multiple modulo-2 addition computations. The set inputs to the modulo-2 adders are:

$$[x_0,x_1,x_2,x_3,x_4,x_5,x_6,x_7]=S(4)\alpha^{10}=[S_0(4),S_1(4),S_2(4),S_3(4),S_4(4),S_5(4),S_6(4),S_7(4)][01110101]. \quad (38)$$

$$[Y_0,Y_1,Y_2,Y_3,Y_4,Y_5,Y_6,Y_7]=S(4)\alpha^{81}=S(4)[11100111]. \quad (39)$$

$$[z_0,z_1,z_2,z_3,z_4,z_5,z_6,z_7]=S(4)\alpha^{25}=S(4)[11011000]. \quad (40)$$

$$[U_0,U_1,U_2,U_3,U_4,U_5,U_6,U_7]=S(4)\alpha^{76}=S(4)[00011110]. \quad (41)$$

Figure 7:
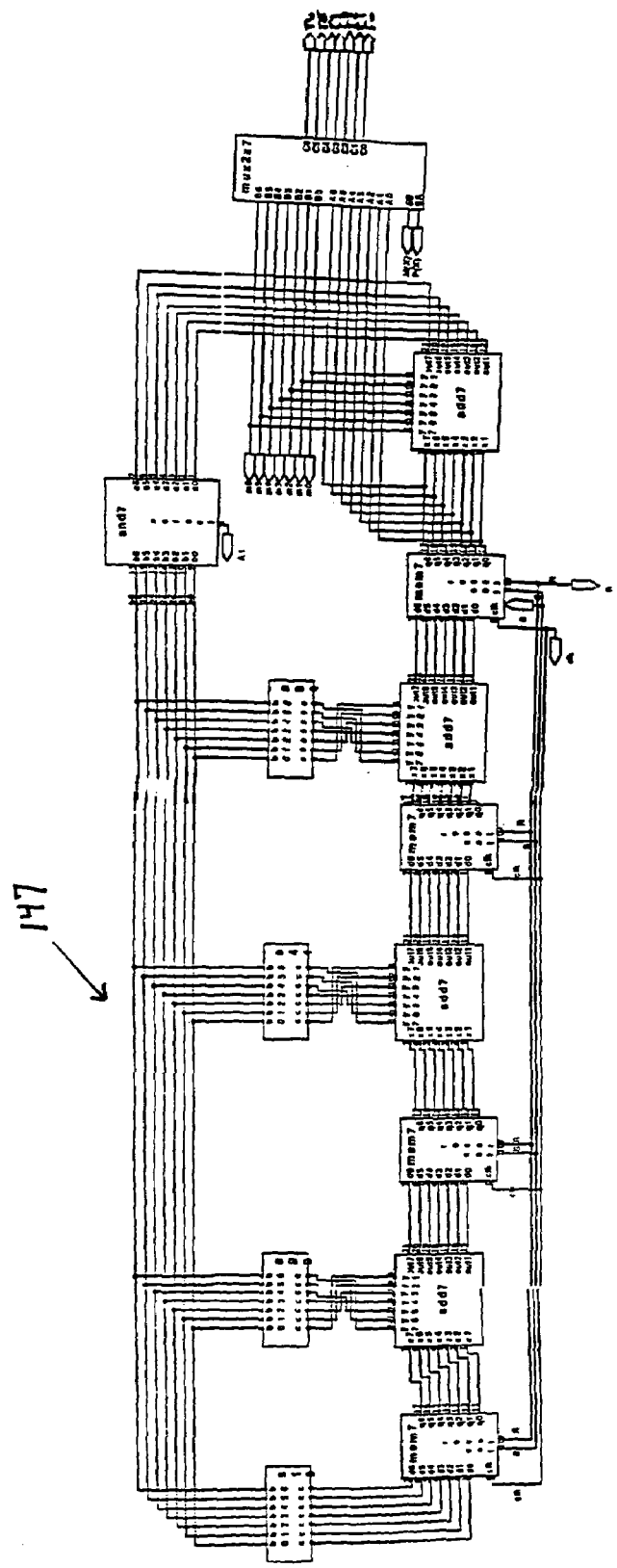
FIG. 7 is a diagram of the MCIFC-2 encoder.

FIG. 7 shows a computer generated MCIFC-2 encoder 149. It consists of four 7-input shift registers and four 7-input modulo-2 adders, with a gating and multiplex circuit. The essential part of the MCIFC-2 decoder is the finite field multiplication circuit, which consists of 50 modulo-2 adders and 49 2-input AND gates.

The second code for multiple cell information field transmission has the generator polynomial:

$$G(MCIFC-2)=x^4+\alpha^{124}x^3+\alpha^3x^2+\alpha^5x+\alpha^{16} \quad (42)$$

which derived from the irreducible polynomial, $$P_2(x)=1+x^3+x^7 \quad (43)$$

The encoder of MCIFC-2 is similar to the encoder of MCIFC-1 except the feedback multiplying factors are: $\alpha^{16}$, $\alpha^5$, $\alpha^3$, $\alpha^{124}$ and $\alpha^0$. The decoder also uses fast polynomial multiplication circuits. Instead of 8 bits as in MCIFC-1 codec, all signal paths in MCIFC-2 are 7 bits. The reason for using MCIFC-2 codec is when smaller number of cells application is more desirable. The computer-designed part of the encoder for MCIFC-2 is shown in FIG. 7.

Figure 8:
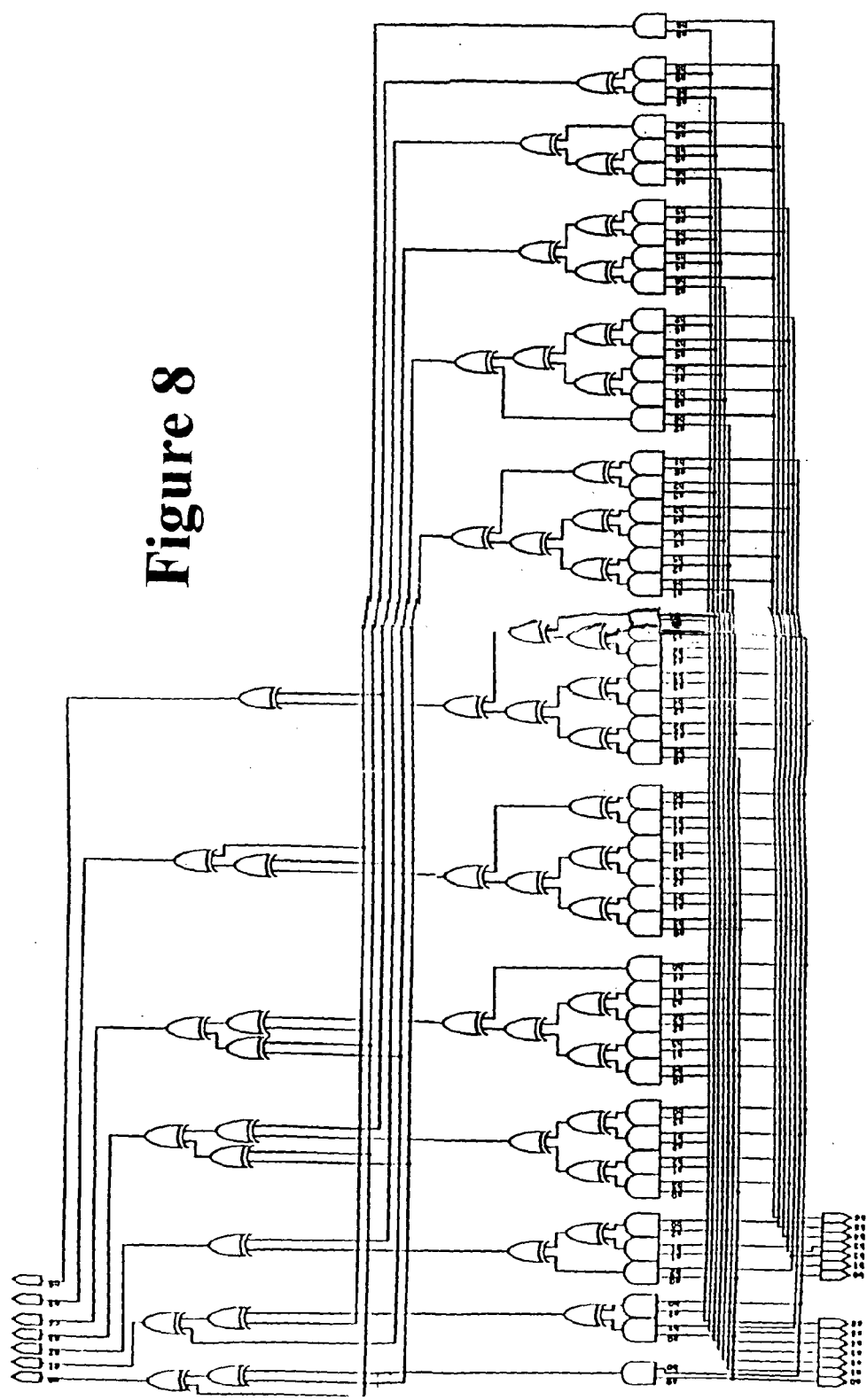
FIG. 8 is a diagram of the reduced multiplication circuit design of the decoder.

FIG. 8 shows a computer generated reduced multiplication circuit design of the MCIRC-2 decoder.

Figure 9:
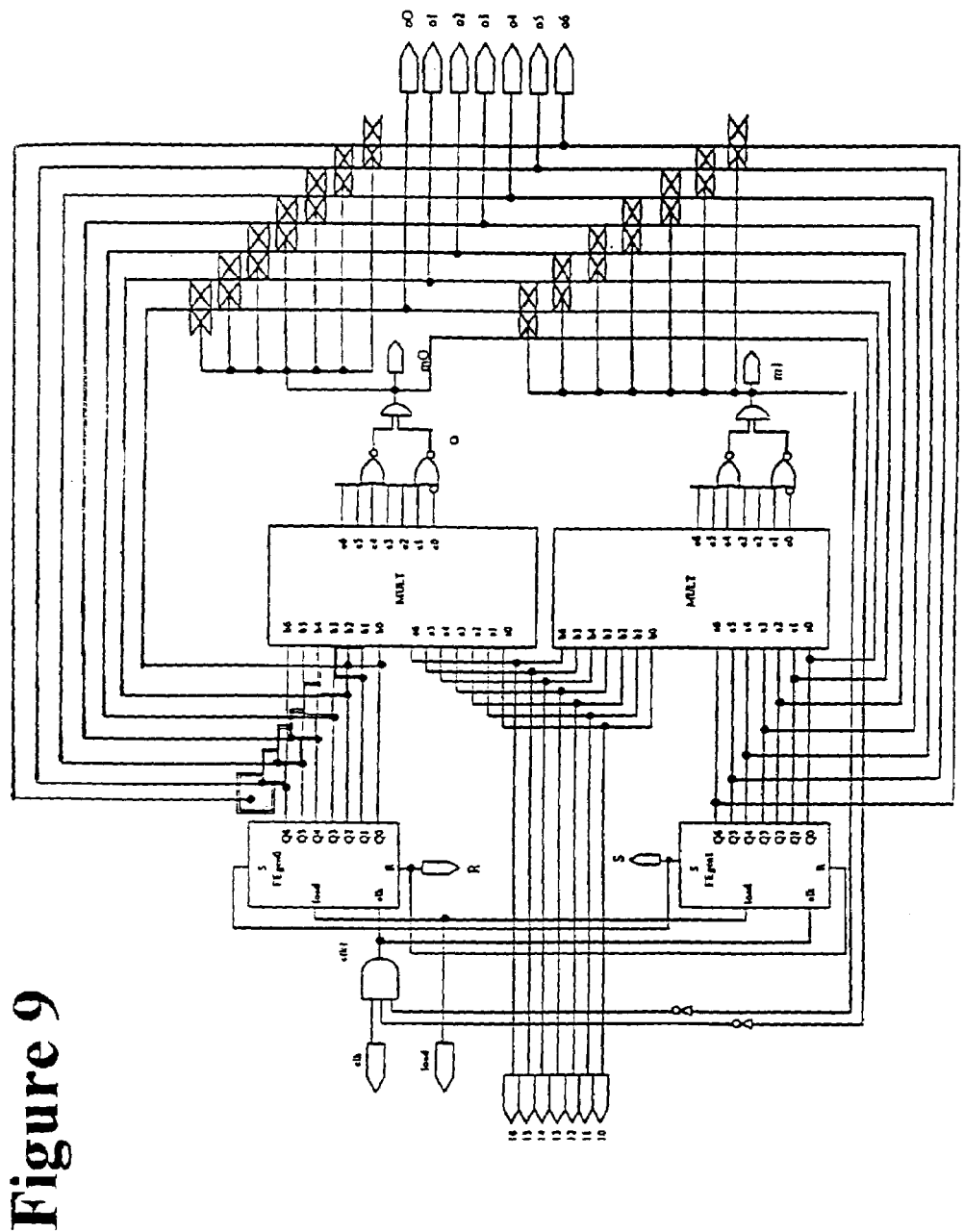
FIG. 9 is a diagram of the error locator finite field inverse calculation circuit of the MCIFC-2 decoder.

FIG. 9 shows the computer generated error locator finite field inverse calculation circuit of MCIFC-2 decoder.

Figure 10:
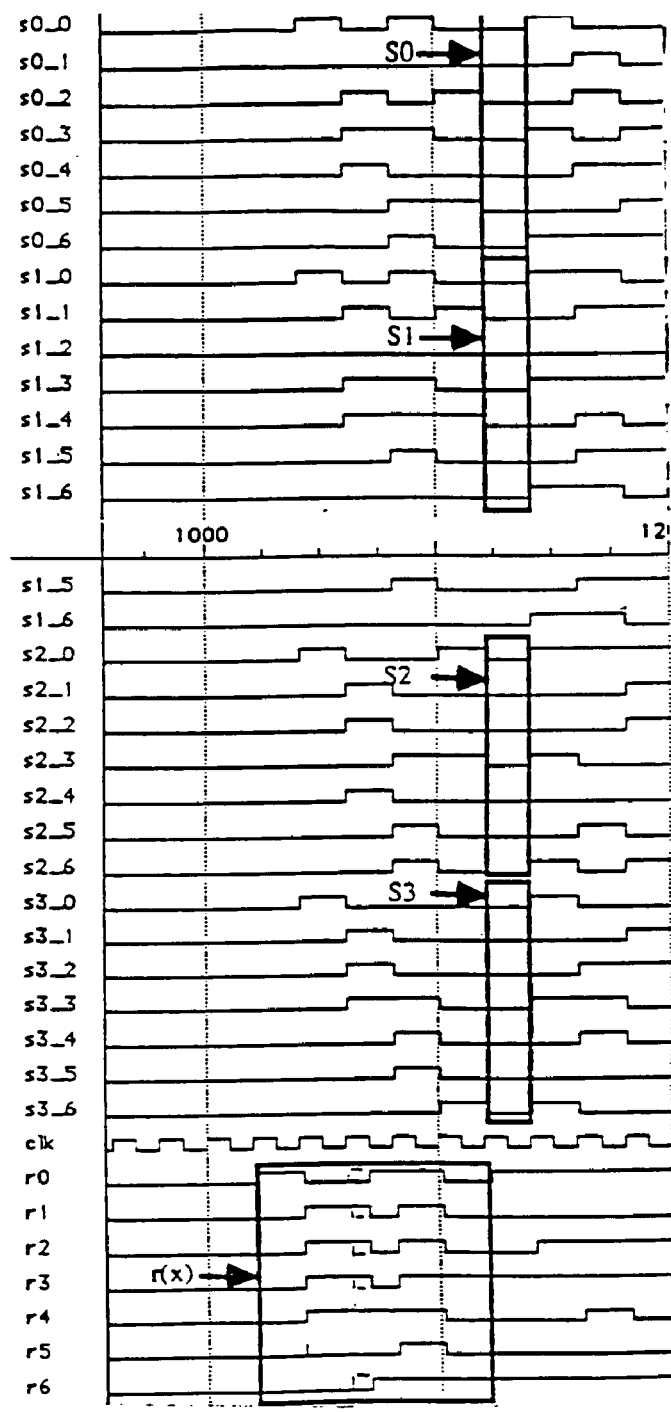
FIG. 10 is a timing diagram for testing of the Syndrome generation circuit.

FIG. 10 shows a timing diagram for testing of the syndrome generation circuit. It indicates the relative timing between the S's and a received sequence. Both MCIFC-1 and MCIFC-2 are non-binary symbol error correcting codes.

In addition to their implementation, their applicability and their precise compatibility to ATM, Internet and satellite communication are the merits of the present invention.

Codecs are used as message buffers. In normal encoding and decoding, message information needs to be stored and in order to wait for the encoding and the error calculation processes to finish before actual error correction takes place. For large powerful codes, the size of the storage in terms of the number shift registers can be huge. Particularly in microelectronics implementation, a codec often cannot be fit into a single chip due to excessive number of required shift registers for message storage. Using the same set of shift registers already available for encoding and decoding purposes provides the solution. For the uneven degrees of the code generator polynomials, a few additional stages are needed in order to make the set of registers all even. The total number of added stages is equal to or less than:

$$S = \sum_{i=1}^{k_o+1} \text{Dif}[(d-1), f+i(d+1)] \quad (44)$$

Where $\text{Dif}[(d-1), f+i(d+1)]$ denotes the difference between the two quantities inside the square bracket. d–1 is the number of parity checks of a code. S is a small number and normally 5% of the total number shift register stages. f=0.1, 2, . . . d–2 and $k_o$ is the number of code sub-generators. By using codecs themselves as buffers, the amount of shift registers saving on the average is 95%. When the number of required shift register stages run into thousands for most useful codecs, the amount of saving is significant. Since a decoder contains a replica of the same encoder, the amount of saving in the number of shift register stages or the number of flip-flops (FF) is:

$$FF=2(m+1)k \quad (45)$$

For a high rate and powerful error correcting codec, the saving in terms of shift registers is significant. For the SCIFC-1 codec, the saving is 700 shift register stages.

A method of Domino Effect in digital transmissions is important. Beyond ATM, Internet, and satellite communications, when ARQs, CRCs, and Checksums are replaced by forward error correction in digital transmissions, without altering the bit space allocation and partitions in the standardized protocol format, the following simultaneous effects take place:

Throughput efficiency is improved, because no re-transmission is necessary.

Reliability is enhanced due to the fact that errors can be corrected.

Effective transmission delay can be significantly reduced due to the combination of short length FEC codes and absence of retransmission.

Transmission channel utilization is increased due to increasing in throughput.

When channel utilization improves, the speed of Internet transmission can be increased.

The implementation is simple, and the cost is minimized.

Because the information field of the ATM cells contains multimedia services, a general scheme of combining different coding gains, coding rates, and different transmission rates is brought forth. The scheme uses a three-codec processor to cover audio, video and have high quality data services. For the same speed operation, the three encoders can be connected in series for encoding and the three decoders can be connected in series for decoding. The codecs are not necessary identical. The most demanding low error rate service, such as bank accounts and/or telemedicine information, the service information goes through all three codecs. The modest demanding service such as, video and/or moving images, two codecs are required. For the least error rate performance service, such as voice, only single codec is needed. Thus, three types of multimedia services are transmitted and received with the same speed, but each service demands different error rate. For single or multiple codecs, the compatibility of ATM cell switching structure—the header and information field is essential.

Figure 11A:
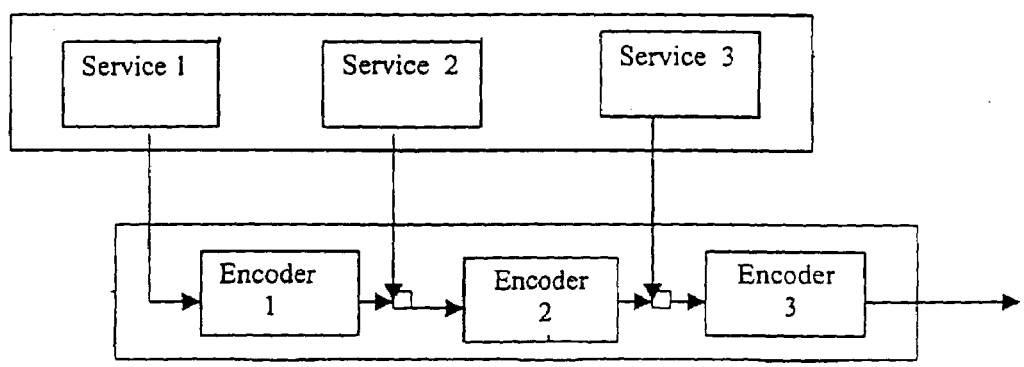
FIG. 11A is the multimedia ATM encoding scheme for three uniform speed but different qualities of services.

FIG. 11A shows a multimedia ATM encoding scheme for three uniform speeds but different qualities of services.

Figure 11B:
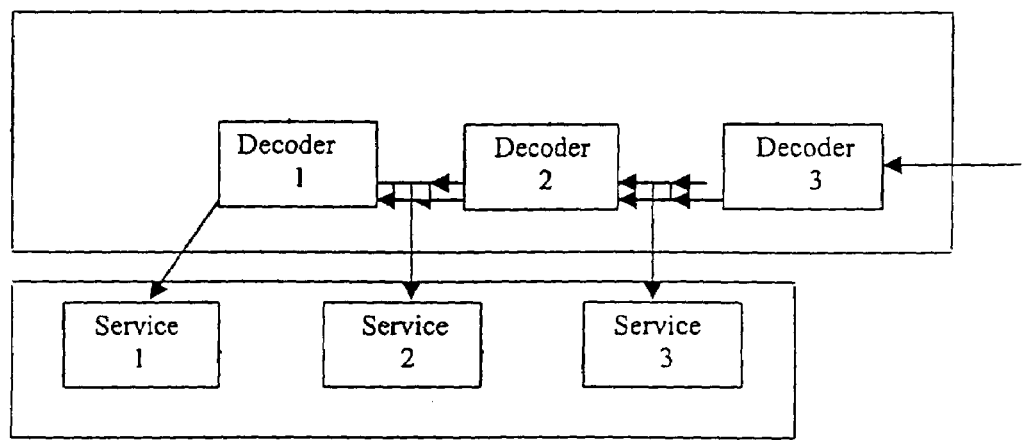
FIG. 11B shows the method of code concatenation for ATM multimedia multiple speed and mixed message transmissions.

FIG. 11B shows a method of decoding for FIG. 11A.

To meet multimedia applications of various speed and error rate requirements, multi-codec processors can be configured for multiple messages and multiple speed operations. In many multimedia applications the services demand not only the error rate performance improvement, but also the variation of transmission speed. In this case, the codecs need to be selected and switched for speed compatibility as well as for error performance desirability. The functional arrangement of a switchable multi-codec processor consists of the functions of the three services at the transmission end, three encoders with programmable connection, a speed selector, an encoder selector, a service matching unit with the encoders, a control and switching logic unit to perform the necessary coordination and timing controls. At the receiving end, the processor consists of a speed identifier, a decoder identifier, and the corresponding set of decoders.

A method of direct evaluation is described when the three disciplines are considered. Transmission efficiency is formulated in terms of retransmission of Internet, satellite propagation delay, and ATM error coding rate.

Step 1: Let the overall throughput efficiency including ATM coding, Internet re-transmission and satellite delay with ARQ scheme be denoted as $\eta_{(ARQ)}$, which is the ratio of the number of errorless digits to the total number of transmitted digits including retransmission. $\eta_{(ARQ)}$ is the product of the following three factors:

$$\eta_{(ARQ)}=\text{(Internet repetition rate)(Satellite delay)} \\ \text{(ATM coding rate)}=\eta_r \eta_s \eta_c \quad (46)$$

Step 2: Let T be the total transmitted sequences, $N_n$ is the number of received sequences without error, $N_p$ is the number of repeated sequences due to ARQ, R is the encoding rate, P the sequence error rate, and p the transmission channel bit error rate. Then, $\eta_s=[1/(t+1)]$, where t is the normalized round trip delay to and from a satellite; $\eta_c=R$, and:

$$\eta_r=[N_n/T]=[(T-N_p)/T]=1-PN_p. \quad (47)$$

$$\text{Thus,}\eta_{(ARQ)}=\eta_r\eta_s\eta_c=(1-PN_p)[1/(t+1)]R \quad (48)$$

Step 3: For Stop-and-Wait ARQ in an Internet/satellite channel, $N_p=t=1$, $\eta(S.W.)=(1-P)R/2$. For Selective Repeat ARQ, $N_p=1$, but t=0, because the scheme is independent of the delay. As a consequence, $\eta(S.R.)=(1-P)R$, which is twice as efficient.

Step 4: When a (n, k, [2E+1]≦d) code is introduce and p is small, the sequence error rate P can be approximated as:

$$P\sim(np)^{E+1}/(E+1)! \quad (49)$$

For a given channel bit error rate p, FEC reduces the error rate from p to P as both n and E increase due to coding. In general P is less than p for any p less than 1.

Step 5: Since the number of repeated sequences is $N_p$, when errors occur during transmission, all the error detected sequences can be corrected, and there is no need to repeat, $N_p \Rightarrow 0$, which implies the repetition part of the throughput efficiency $\eta_r \Rightarrow 1$ as the limit. This is precisely the justification of the throughput efficiency improvement. If $N_I$ is the number of initial transmitted sequences, the amount of throughput improvement can be calculated as:

$$\Delta\eta=\eta_{(ARQ)}/\eta_{(FEC)}=[N_n/(N_I+N_p)]/(N_n/N_I)=N_I/(N_I+N_p). \quad (50)$$

When $N_p \Rightarrow 0$, the normalized throughput improvement $\Delta\eta \Rightarrow 1$ When retransmission is minimized or eliminated, congestion due to repeated transmission is eased.

All specific solutions in this invention meet the international protocol standards. For ATM, it is the ATM cell switching structure established by ITU and ATM Forum. For Internet, it is the Internet Transmission Protocol formats established by the Internet Engineering Task Force (IETF). For satellites, they are the ITU-T endorsed International Telecommunications Satellite Organization's SSOG (Satellite Systems Operations Guidelines), and the INTELSAT TDMA Specifications.

The ATM cell reference switching structure consists of the routing segment and the message segment. The message part of the structure consists of an 8-bit Header Error Check (HEC) in a total 40 bits Message Header. The total number of bits in the Information Field is 384. Excluding the Routing Header, the total number of bits in an ATM standard message cell is 40+384=424. The number of bits in the Routing Header is 3×8=24. The solutions meet the precise International standards.

The transmission standard for Internet is the 15 transmission protocols including IP, TCP, and UDP. Each has a header. The IP header contains 32-bit each for source and destination addresses. The TCP header consists of 16-bit Source Port, 16-bit Destination Port, 32-bit Sequence Number, 32-bit Acknowledgement Number, 4-bit Offset, 6-bit reserved, 6-bit Flags, 16-bit Window, 16-bit Urgent Pointer, and 16-bit each for Options and Padding. The UDP header consists of 32 bit port numbers, 32-bit each for sequence and acknowledgement numbers. All three headers contain a 16-bit checksum.

The protocol standards for global satellite communications are represented by the INTELSAT TDMA system. Within the system there are a number of distinctive protocols for system acquisition, synchronization, network control, burst time plans for traffic allocation and transmission, and station switching-over. With respect to ATM and Internet, it is the traffic segment of the Preamble format, which carries ATM over Internet via satellites. The Preamble format is highly frame structured. The 120,000 symbol basic frame contains a reference burst and a traffic burst. Sixteen consecutive basic frames constitute multi-frame, during which each station is addressed. The sequence of addresses is completed over 32 multi-frames. The 32 multi-frames are referred to as a control frame. Sixteen control frames constitute a super-frame, during which the coordination of burst plan changes and satellite parameter calculations take place.

For both reference and traffic bursts, the corresponding bit allocations are identified as 24-symbol unique word is for acquisition and phase ambiguity resolution for phase modulation. The 16-symbol is for transmission type and service channel. There are total 64 symbols allocated for two order wires. Only the reference burst has the 8-symbol control and delay channel. Depending on the type of modulation used, there can be either 2 or 4 bits per symbol.

This invention reduces the number of satellite reference bursts from two to one—a significant saving. Additionally, there is a reduction of number of symbols at each level of the frame hierarchy. Therefore, all schemes advanced in this invention meet the international standards of ATM, Internet, and satellite communications.

In comparison, both ATM and Internet protocols are much shorter length than the satellite protocol. This makes the satellite channel inefficient when it carries ATM and Internet traffic. A solution is to reduce the satellite traffic segment of the frame length. But, when the traffic burst is reduced, the relative efficiency of the Preamble is decreased. Thus the key to increasing satellite efficiency when carrying ATM and Internet traffic is to decrease not only the reference burst length, but also the traffic burst. The idea is to reduce any frame structured satellite transmission format to a minimal length. In the case of INTELSAT TDMA, a simple solution is to reduce the frame length from 120,000 symbols to 1,200 symbols. When the frame length is reduced, the existing error coding schemes are no longer functional. Then, the solutions in this invention become necessary.

The principle of dynamic programming is to break down a difficult and complex problem into a sequence of simpler and easier to solve sub-problems one at a time. The principle of optimality in dynamic programming refers to any optimal strategy has the property that, whatever the current state and decision, the remaining decision must constitute an optimal strategy with regard to the state resulting from the current decision. The results of dynamic programming are globally optimized. The sub-problems of ATM, Internet, and satellites still need to be locally balanced for overall optimization. For this reason, the following sub-problem needs to be also solved: In QoMS, how to minimize ATM switching and maximize bandwidth in Internet simultaneously? QoMS optimization can be obtained by means of mixed integer programming with a Branch-and-Bound Algorithm (BBA). The reason for BBA is that bandwidth and capacity values are not always expressed in integers, and BBA helps to obtain all integers from non-integer values. The same technique can be applied to maximizing satellite transponder traffic with minimal number of antenna beam switching. In both cases, the objective function is in the form: min.max [x(i, j)/C(i, j)], for all i and j. Where x(i, j) is the amount of traffic in AIS network link from the ith terminal to the j's destination. C(i, j) is the total bandwidth capacity for the link I–j. Depending on the network architecture, a set of constraints for the objective functions is identified.

For real time multimedia information, which is uncertain in characteristic, probabilistic or stochastic programming techniques may come to the rescue. In general, probabilistic programming refers to non-deterministic coefficients in an objective function or probabilistic constraints in formation of mathematical programming, such as linear, non-linear, integer, combinatorial, as well as dynamic programming. It is useful when optimal solutions are sought for problems arise due to either environment, condition, or objective cannot be precisely determined. These non-deterministic factors can be only made available statistically either parametrically or non-parametrically. However, many decisions must be made under such risk and uncertainty. The impact of these decisions affects the overall reliability of all multimedia wireless networks.

Figure 12:
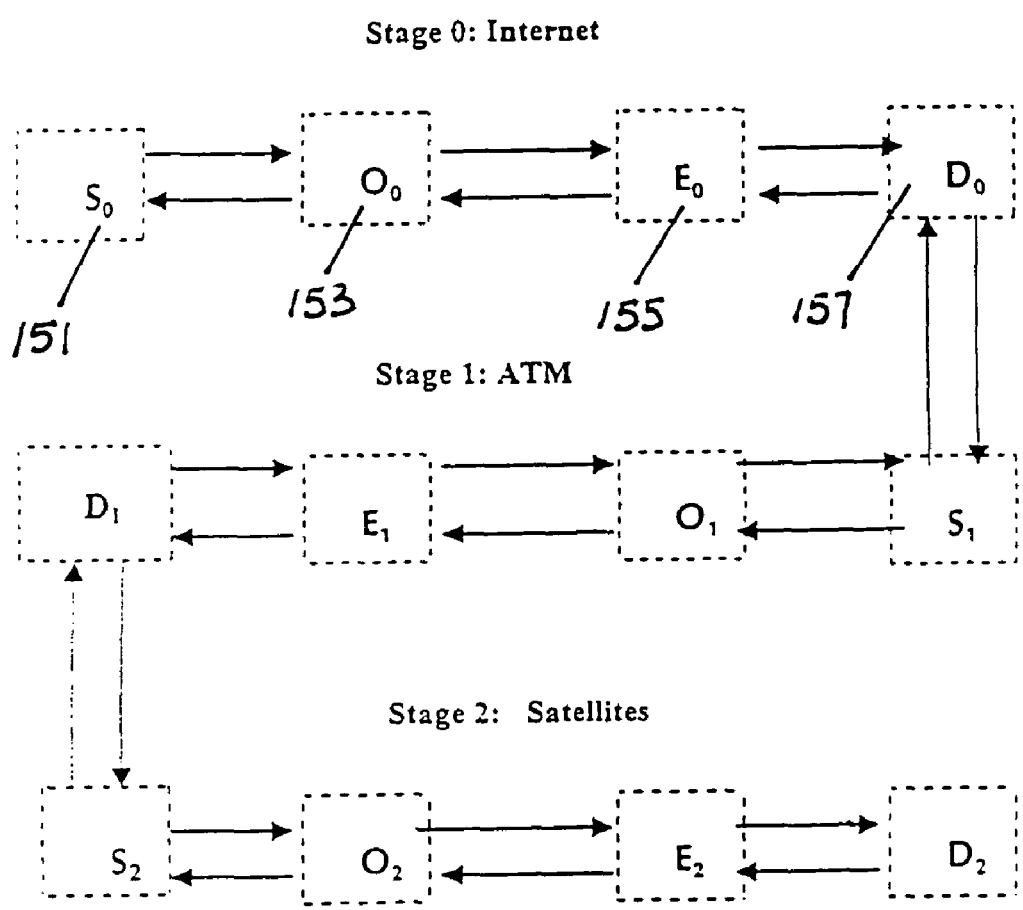
FIG. 12 shows a three-stage dynamic-probabilistic programming structure for the ATM, Internet, and satellite communications network.

FIG. 12 shows a 3-stage dynamic-probabilistic programming structure for an ATM, Internet, and satellite communications network. When dynamic and probablistic programmings are combined, reliability problems may be expressed in terms of stages. Each stage consists of a sequence of functions in terms of state (S) 151, outcome (O) 153, event (E) 155, and decision (D) 157. For a three stage dynamic-probabilistic programming structure for the ATM, Internet, and satellite networks, the logic flow is shown in FIG. 12.

The diagram indicates the sequential flow in dynamic-probabilistic programming. Between any two states, there are probabilistic outcomes, events, and decision-making processes. As the arrows indicate, dynamic probabilistic programming sequence can move forward as well as backward as signaling through the ATM, Internet, and satellite networks.

All finite geometries can provide orthogonal structures for threshold decodable. Thus all codes derivable from finite geometries can be majority logic decodable.

There exist two fundamental geometries over finite field: Euclidean and projective. These geometries are represented by their dimension t over a finite field of n elements. t is the size of the ordered collection of elements that belong to the field. An ordered set of t elements is called a point in the geometry, and any linear combination of two or more points is called a line in the geometry. Euclidean and projective geometries are denoted by EG(t,n) and PG(t,n), respectively.

Similar to projective geometry above, the following applies to Euclidean geometry: Let $x_0, x_1, \ldots, x_t$ be the ordered t+1 elements and $\alpha_o, \alpha_1, \ldots, \alpha_t$ be the t+1 field elements from GF(n), which has n−1 nonzero elements. A point in t-dimension PG(t, n) is a set of such t+1 elements. Thus there are $n^{t+1}-1$ nonzero points in PG(t,n). Because the points $P_o=(\alpha_o, \alpha_1, \ldots, \alpha_t)$ and $P_o'=(\xi \alpha_o, \xi\alpha_1, \ldots, \xi \alpha_t)$ are the same for every field element $\xi \neq 0$, the total number of points in PG(t, n) may be divided into groups of n−1 nonzero field elements with the points in the same group representing the same point. Hence PG(t, n) has $(n^{t+1}-1)/(n-1)$ distinct points. For any two distinct points $P_O=(\alpha_0, \alpha_1, \ldots, \alpha_4)$ $P_I=(\beta_0, \beta_1, \ldots, \beta_1)$, we can define the line joining these two points as the set of points of the form:

$$\lambda_O P_O + \lambda_1 P_I = (\lambda_0\alpha_0 + \lambda_1\beta_I, \ldots, \lambda_0\alpha_t + \alpha_1\beta_t) \quad (51)$$

with $\lambda_0$ and $\lambda_1$ in GF(n). The points of a line form a one-dimensional geometry and the line has $(n^{t+1}-1)/(n-1) = n+1$ points. In PG(t, n) the points that satisfy a set of t−r linear independent equations:

$$\alpha_{i0}x_0 + \alpha_{i1}x_1 + \ldots + \alpha_{it}x_t = 0 \quad (52)$$

for i=1, 2, . . . , t−r are said to form an r-dimensional subspace (or flat) of PG(r, n).

Let $P_O, P_1 \ldots, P_r$ be (r+1) linear independent points:

$$\xi_0 P_0 + \xi_1 P_1 + \ldots + \xi_r P_r = (0, \ldots, 0). \quad (53)$$

This implies $\xi_0 = \xi_1 \ldots = \xi_r = 0$ for nonzero points in PG(r, n). Consider all points of the form $\xi_0 P_0 + \xi_1 P_1 + \ldots + \xi_r P_r$, for $r \geq 1$ the subspace contains the line joining any two points in the subspace. Hence, every PG(r, n) has $(n^{t+1}-1)/(n-1)$ points. The number of PG(r, n) for r<t can be obtained as follows. Since every PG(r, n) is determined by r+1 independent points, the first point may be chosen in $(n^{t+1}-I)/(n-I)$ ways. With the first point deleted, the second point may be chosen in $[(n^{t+1}-1)/(n-1)]-1$ ways. The third point may be chosen from any point that is not on the line through the previous two points. Since a line contains $(n^2-1)/(n-1)$ points, the third points can be chosen in $[(n^{t+1}-1)/(n-1)]-[(n^2-1)/(n-1)]$ ways. Similarly the r+I point may be chosen in the following number of ways:

$$[(n^{t+1}-1)-(n^i-1)]/(n-1) = n^i(n^{t-i+1}-1) \quad (54)$$

Hence there exists $$\prod_{i=0} n^i(n^{t-i+1} - 1)/(n - 1) \quad (55)$$

ordered sets of (r+1) independent points in PG(t, n). There are $$\prod_{i=0}^{r} n^i(n^{t-i+1} - 1)/(n - 1) \quad (56)$$

ordered sets of (r+I) points in each PG(r, n). The number of r-dimensional subspaces in PG(t, n) is the ratio, that is:

$$R(t, r, n) = \left[\prod_{i=0}^{r} n^i(n^{t-i+1} - 1)/(n - 1)\right] / \left[\prod_{i=0}^{r} n^i(n^{r-i+1} - 1)/(n - 1)\right] \quad (57)$$

$$= [(n^{t+1} - 1)(n^t - 1) \ldots (n^{t-r+1} - 1)]/$$
$$[(n^{r+1} - 1)(n^r - 1) \ldots (n - 1)]$$
$$= [(1 + \ldots + n^t)(n + \ldots + n^t) \ldots (n^r + \ldots + n^t)]/$$
$$[(1 + \ldots + n^r) \ldots (n^{r-1} + n^r)n^r]$$

The last expression is obtained by converting the ratios into series form:

$$(n^{r+1}-1)/(n-1)=1+n+\ldots+n^r. \quad (58)$$

EG provides more codes, but also yields higher minimum distance for the same k/n.

Next, for s>r, we want to find the number of PG(s, n) in PG(t, n) that contain a PG(r, n). First we choose a point $P_{r+1}$ not contained in the given PG(r, n). $P_{r+1}$ may be chosen out of $n^{r+1}+ \ldots +n^t$ points. We then choose $P_{r+2}$ out of the $n^{r+2}+ \ldots +n^t$ points not contained in PG(r+1, n), which contains $P_{r+1}$ and the given PG(r, n). Continuing in this manner we can obtain a PG(s, n) containing the given PG(r, n) in $(n^{r+1}+ \ldots +n^t) \ldots (n^s+ \ldots +n^t)$ ways. Letting t=s implies every PG(s, n) is obtained in $(n^{r+1}+ \ldots +n^s) \ldots (n^{s-1}+n^s)n^s$ ways. The number of different PG(s, n) in PG(t, n) which contain a given PG(r,n) is:

$$[(n^{r+1}+ \ldots n^t) \ldots (n^s+ \ldots +n^t)]/$$
$$[(n^{r+1}+ \ldots +n^s) \ldots (n^{s-1}+ \ldots +n^r)n^r] \quad (59)$$

As a consequence we have,

Every PG(t, n) contains exactly $1+n+ \ldots +n^t$ points.

Every PG(t, n) contains exactly $(1+n+\ldots+n^t) \ldots (n^r+ \ldots +n^t)/(1+n+ \ldots +n') \ldots (n^{r-1}+n')n^r$ number of PG(r,n)'s.

Every PG(r, n) in PG(t, n) is contained the same number as PG(s,n)'s.

For r=0, every point is contained in $$\gamma=(n+ \ldots +n^t) \ldots (n^s+ \ldots +n^t)/(n+ \ldots +n^s) \ldots$$
$$(n^{s-1}+n^s)n^s \quad (60)$$

PG(s, n) of a PG(t, n) for t≧s>0.

For r=1, every line is contained in $$\lambda=(n^2+ \ldots +n^t) \ldots (n^s+ \ldots +n^t)/(n^2+ \ldots +n^s) \ldots$$
$$(n^s) \quad (61)$$

PG(s, n) for t≧s>1.

Note that every PG(s, n) contains the whole line joining every pair of points. Thus, every pair of points is contained in λ different PG(s, n). If we identify the number of points as v, and the number of subspaces PG(s, n) as b, then the PG(s, n) contained in a PG(t, n) form a balanced incomplete block (BIB) design with:

b=$(1+n+ \ldots +n^t) \ldots (n^s+ \ldots +n^t)/(1+ \ldots +n^s) \ldots ) \ldots$
$(n^{s-1}+ \ldots +n^s)n^s$ v=$1+n+ \ldots +n^t$, Ξ=$(n+ \ldots +n^t) \ldots (n^s+ \ldots +n^t)/(n+ \ldots +n^s) \ldots$
$(n^{s-1}+ \ldots +n^s)n^s$ λ=1, if s=1.

λ=$(n^2+ \ldots +n^t) \ldots (n^s+ \ldots +n^t)/(n^2+ \ldots +n^s) \ldots (n^{s-1}+n^s)n^s$, if s>1.

EXAMPLE 1

For PG(3, 2), let s=1.

b=$(1+2+2^2+2^3)(2+2^2+2^3)/(1+2)2$_=35 lines v=$1+2+2^2+2^3$=15 points k=1+n=3=Every line of PG(3,2) contains 3 points. γ=7, and λ=1

Since n=2, GF(2) contains only 0,1 elements. The 15 points are

```
1000  0100  0010  0001  1100  1010  1001  0110
0101  0011  1110  1101  1011  0111  1111
```

The lines of PG(3,2) can be obtained by taking pairs of points as $\lambda_0 \, p_0+\lambda_1 \, p_1$ for $(\lambda_0, \lambda_1)$=(0, 1), (1, 0), (1, 1).

From the geometrical parameters, a block design is defined as an arrangement of v elements in b sets, each of which contains k elements; each element can be shared by exactly r sets; every pair of elements occurs in exactly λ sets, and every element occurs at most once in a set. Thus a block design is characterized by the five parameters v, b, k r, and λ. The necessary conditions for the existence of a block design are:

$$bk=vr, \text{and } r(k-1)=\lambda(v-1). \quad (62)$$

The conditions directly come from the definition: the first condition says that there are a total of v elements; each of the v/b elements in a set has klr shared elements. The second one states that the total number of paired v elements is λ(v−1), which is equal to the total elements in the shared sets, which is r(k−1). A block design is best described by its corresponding incidence matrix of v rows and b columns. The matrix contains only binary elements $a_{ij}$ such that $a_{ij}$=1, if $v_i$ incident on $b_j$; with $a_{ij}$=0, otherwise.

Many block codes owe their origins to block designs.

EXAMPLE 2

The block design with parameters $v=6$, $b=10$, $k=3$, $r=5$, and $\lambda=2$ is:

| $B_0$ | $B_1$ | $B_2$ | $B_3$ | $B_4$ | $B_5$ | $B_6$ | $B_7$ | $B_8$ | $B_9$ |
|---|---|---|---|---|---|---|---|---|---|
| 0 | 1 | 0 | 0 | 2 | 5 | 1 | 1 | 4 | 0 |
| 1 | 2 | 2 | 1 | 5 | 3 | 3 | 2 | 0 | 2 |
| 5 | 5 | 3 | 3 | 3 | 4 | 4 | 4 | 5 | 4 |

The corresponding incidence matrix of the block design is:

```
1 0 1 1 0 0 0 0 1 1
1 1 0 1 0 0 1 1 0 0
0 1 1 0 1 0 0 1 0 1
0 0 1 1 1 1 1 0 0 0
0 0 0 0 0 1 1 1 1 1
1 1 0 0 1 1 0 0 1 0
```

This matrix has b=10 blocks or columns, v=6 rows, each block has k=3 non-zero elements, each row has r=5 non-zero elements, and any pair of rows has exact $\lambda=2$ 1's in common. If this matrix is amended with an identity matrix, it becomes the generator matrix of the (16, 6, 6) block code.

EXAMPLE 3

The incidence matrix of the block design v=5, b=10, k=3, r=6, $\lambda=2$ is:

```
0 0 1 1 1 0 1 0 1 1
1 0 0 1 1 1 0 1 0 1
1 1 0 0 1 1 1 0 1 0
1 1 1 0 0 0 1 1 0 0
0 1 1 1 0 1 0 1 1 0
```

If we add a 6×6 identity matrix to the left of above, we have:

```
1 0 0 0 0  0 0 1 1 1 0 1 0 1 1
0 1 0 0 0  1 0 0 1 1 1 0 1 0 1
0 0 1 0 0  1 1 0 0 1 1 1 0 1 0
0 0 0 1 0  1 1 1 0 0 0 1 1 0 1
0 0 0 0 1  0 1 1 1 0 1 0 1 1 0
```

Which is the generator matrix of the BCH (15, 5, 7) with generator polynomial:

$G(X) = X^{10} + X^8 + X^5 + X^4 + X^2 + X + 1$

Gallager formulateded, analyzed, and constructed Low Density Parity Check (LDP) codes. This class codes with parameters (n, j, k) is defined from a parity check matrix of n columns that have j ones in each column, k ones in each row, and zero. Low density implies that both j and k values are small in comparison to n LDP codes are threshold decodable. Each digit in a received code word is checked by j parity check equations because the number of 1's is sparse, other code word digits are not likely to be checked by the j equations. With higher probability an error digit is more likely to be checked by more number of check equations. Decoding decision is based on an estimated digit that is in error if more than μ number of the check digits are incorrect. μ is a design parameter depending on the code and channel noise statistics. Townsend and Weldon developed a procedure in order to improve the LDP decoding performance. Their scheme works as follows: With the first digit, examine the j parity check equations. If all the check sums are 1, change the first digit recomputed all check sums, otherwise proceed to the next digit. If no changes in the n digits, reduce the threshold to j−1. The procedure continues with each time lower the threshold level in terms of the number of check equations.

EXAMPLE 4

The original code matrix of the LDP code by Gallager with parameters n=20, j=3, and k=4 is:

```
1 1 1 1 0 0 0 0 0 0 0 0 0 0 0 0 0 0 0 0
0 0 0 0 1 1 1 1 0 0 0 0 0 0 0 0 0 0 0 0
0 0 0 0 0 0 0 0 1 1 1 1 0 0 0 0 0 0 0 0
0 0 0 0 0 0 0 0 0 0 0 0 1 1 1 1 0 0 0 0
0 0 0 0 0 0 0 0 0 0 0 0 0 0 0 0 1 1 1 1

1 0 0 0 1 0 0 0 1 0 0 0 1 0 0 0 0 0 0 0
0 1 0 0 0 1 0 0 0 1 0 0 0 0 0 0 1 0 0 0
0 0 1 0 0 0 1 0 0 0 0 0 1 0 0 0 1 0 0
0 0 0 1 0 0 0 0 0 1 0 0 0 1 0 0 0 0 1 0
0 0 0 0 0 0 0 1 0 0 0 1 0 0 0 1 0 0 0 1

1 0 0 0 0 1 0 0 0 0 1 0 0 0 0 1 0 0
0 1 0 0 0 0 1 0 0 0 1 0 0 0 1 0 0 0 0
0 0 1 0 0 0 0 1 0 0 0 0 1 0 0 0 0 0 1 0
0 0 0 1 0 0 0 0 1 0 0 0 0 1 0 0 1 0 0 0
0 0 0 0 1 0 0 0 0 1 0 0 0 0 1 0 0 0 0 1
```

For this code it has 4×20=80 ones out of 20×20=400 entries. The rest 400−80=320 are zeros. The density of ones is 80/400=0.20. The block design with parameters v=15, b=20, k=3, and r=5 provides a low-density parity check like code as above.

EXAMPLE 5

Since LDP only requires low value of j and k in a (n, j, k) parity check matrix, we examine the following block design with parameters v=b=21, k=r=5, and $\lambda=1$. The incidence matrix of the design I:

| | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | |
|---|---|---|---|---|---|---|---|---|---|---|---|---|---|---|---|---|---|---|---|---|---|---|
| | 0 | 0 | 0 | 1 | 0 | 0 | 1 | 1 | 0 | 0 | 0 | 0 | 1 | 0 | 1 | 0 | 0 | 0 | 0 | 0 | 0 | 0 |
| | 0 | 0 | 0 | 0 | 1 | 0 | 0 | 1 | 1 | 0 | 0 | 0 | 0 | 1 | 0 | 1 | 0 | 0 | 0 | 0 | 0 | 1 |
| | 0 | 0 | 0 | 0 | 0 | 1 | 0 | 0 | 1 | 1 | 0 | 0 | 0 | 0 | 1 | 0 | 1 | 0 | 0 | 0 | 0 | 2 |
| | 0 | 0 | 0 | 0 | 0 | 0 | 1 | 0 | 0 | 1 | 1 | 0 | 0 | 0 | 0 | 1 | 0 | 1 | 0 | 0 | 0 | 3 |
| | 0 | 0 | 0 | 0 | 0 | 0 | 0 | 1 | 0 | 0 | 1 | 1 | 0 | 0 | 0 | 0 | 1 | 0 | 1 | 0 | 0 | 4 |
| | 0 | 0 | 0 | 0 | 0 | 0 | 0 | 0 | 1 | 0 | 0 | 1 | 1 | 0 | 0 | 0 | 0 | 1 | 0 | 1 | 0 | 5 |
| | 0 | 0 | 0 | 0 | 0 | 0 | 0 | 0 | 0 | 1 | 0 | 0 | 1 | 1 | 0 | 0 | 0 | 0 | 1 | 0 | 1 | 6 |
| | 1 | 0 | 0 | 0 | 0 | 0 | 0 | 0 | 0 | 0 | 1 | 0 | 0 | 1 | 1 | 0 | 0 | 0 | 0 | 1 | 0 | 7 |
| | 0 | 1 | 0 | 0 | 0 | 0 | 0 | 0 | 0 | 0 | 0 | 1 | 0 | 0 | 1 | 1 | 0 | 0 | 0 | 0 | 1 | 8 |
| | 1 | 0 | 1 | 0 | 0 | 0 | 0 | 0 | 0 | 0 | 0 | 0 | 1 | 0 | 0 | 1 | 1 | 0 | 0 | 0 | 0 | 9 |
| | 0 | 1 | 0 | 1 | 0 | 0 | 0 | 0 | 0 | 0 | 0 | 0 | 0 | 1 | 0 | 0 | 1 | 1 | 0 | 0 | 0 | 10 |
| | 0 | 0 | 1 | 0 | 1 | 0 | 0 | 0 | 0 | 0 | 0 | 0 | 0 | 0 | 1 | 0 | 0 | 1 | 1 | 0 | 0 | 11 |
| | 0 | 0 | 0 | 1 | 0 | 1 | 0 | 0 | 0 | 0 | 0 | 0 | 0 | 0 | 0 | 1 | 0 | 0 | 1 | 1 | 0 | 12 |
| | 0 | 0 | 0 | 0 | 1 | 0 | 1 | 0 | 0 | 0 | 0 | 0 | 0 | 0 | 0 | 0 | 1 | 0 | 0 | 1 | 1 | 13 |
| | 0 | 0 | 0 | 0 | 0 | 1 | 0 | 1 | 0 | 0 | 0 | 0 | 0 | 0 | 0 | 0 | 0 | 1 | 0 | 0 | 1 | 14 |
| | 1 | 1 | 0 | 0 | 0 | 0 | 1 | 0 | 1 | 0 | 0 | 0 | 0 | 0 | 0 | 0 | 0 | 0 | 1 | 0 | 0 | 15 |
| | 0 | 1 | 1 | 0 | 0 | 0 | 0 | 1 | 0 | 1 | 0 | 0 | 0 | 0 | 0 | 0 | 0 | 0 | 0 | 1 | 0 | 16 |
| | 0 | 0 | 1 | 1 | 0 | 0 | 0 | 0 | 1 | 0 | 1 | 0 | 0 | 0 | 0 | 0 | 0 | 0 | 0 | 0 | 1 | 17 |
| | 1 | 0 | 0 | 1 | 1 | 0 | 0 | 0 | 0 | 1 | 0 | 1 | 0 | 0 | 0 | 0 | 0 | 0 | 0 | 0 | 0 | 18 |
| | 0 | 1 | 0 | 0 | 1 | 1 | 0 | 0 | 0 | 0 | 1 | 0 | 1 | 0 | 0 | 0 | 0 | 0 | 0 | 0 | 0 | 19 |
| | 0 | 0 | 1 | 0 | 0 | 1 | 1 | 0 | 0 | 0 | 0 | 1 | 0 | 1 | 0 | 0 | 0 | 0 | 0 | 0 | 0 | 20 |

For this block design it has 5×21=105 ones out of 21×21=441 entries, and the rest 441−105=336 are zeros. The density of ones is (105/441)=0.23.

EXAMPLE 6

The blocks of $v=9$, $b=12$, $k=3$, $r=4$, and $\lambda=1$ design are:

| $B_0$ | $B_1$ | $B_2$ | $B_3$ | $B_4$ | $B_5$ | $B_6$ | $B_7$ | $B_8$ | $B_9$ | $B_{10}$ | $B_{11}$ |
|---|---|---|---|---|---|---|---|---|---|---|---|
| 1 | 4 | 7 | 1 | 2 | 3 | 1 | 2 | 3 | 1 | 2 | 3 |
| 2 | 5 | 8 | 4 | 5 | 6 | 5 | 6 | 4 | 6 | 4 | 5 |
| 3 | 6 | 9 | 7 | 8 | 9 | 9 | 7 | 8 | 8 | 9 | 7 |

The corresponding incidence matrix is:

$$\begin{vmatrix}
1 & 0 & 0 & 1 & 0 & 0 & 1 & 0 & 0 & 1 & 0 & 0 \\
1 & 0 & 0 & 0 & 1 & 0 & 0 & 1 & 0 & 0 & 1 & 0 \\
1 & 0 & 0 & 0 & 0 & 1 & 0 & 0 & 1 & 0 & 0 & 1 \\
0 & 1 & 0 & 1 & 0 & 0 & 0 & 0 & 1 & 0 & 1 & 0 \\
0 & 1 & 0 & 0 & 1 & 0 & 1 & 0 & 0 & 0 & 0 & 1 \\
0 & 1 & 0 & 0 & 0 & 1 & 0 & 1 & 0 & 1 & 0 & 0 \\
0 & 0 & 1 & 1 & 0 & 0 & 0 & 1 & 0 & 0 & 0 & 1 \\
0 & 0 & 1 & 0 & 1 & 0 & 0 & 0 & 1 & 1 & 0 & 0 \\
0 & 0 & 1 & 0 & 0 & 1 & 1 & 0 & 0 & 0 & 1 & 0
\end{vmatrix}$$

This block design has 3×12=4×9=36 ones out of 9×12=108 entries with 72 zeros. The density is 0.33.

EXAMPLE 7

There exist two block designs, which exhibit low parity check densities. Both block designs are derivable from finite geometries:

From EG(2,9), the block design parameters are: $v=81$, $b=90$, $k=9$, $r=10$, and $\lambda=1$.

From PG(2,9), the parameters are: $v=91$, $b=91$, $k=10$, $r=10$, and $\lambda=1$.

For threshold decodable low-density parity check codes, the EG(2,9) block design gives the density (81×9)/(81×90)= 0.11. The PG(2,9) block design yields a density (910/8281)= 0.10.

A block design with parameters ($v$, $b$, $k$, $r$, $\lambda$) may be resolvable if the $b$ blocks can be partitioned into $r$ groups of $q$ sub-blocks in such a way that each of the $v$ elements occurs exactly once in each sub-block. The existence of a resolvable block design (RBD) meets the condition $v \leq b-r+1$. When $s$ is a prime power, resolvable designs exist with parameters, $v=s^3+1$, $b=s^2(s^2-s+1)$, $r=s^2$, $k=s+1$, $\lambda=1$.

EXAMPLE 8

For $s=2$, $v=9$, $b=12$, $r=4$, $k=3$, and $\lambda=1$. The resolvable design is:

```
012  036  057  048
345  147  138  156
678  258  246  237
```

A resolvable design is called affine resolvable if any two sub-blocks belonging to different classes have the same number of elements in common. For such block designs $v=b-r+1$ with equal sign. Such block design parameters in terms the number of sub-blocks in each class n, and the number of classes t are:

$v=n^2[(n-1)t+1]$  $b=n(n^2t+n+1)$ $r=n^2t+n+1$  $k=n[(n-1)t+1]$ $\lambda=nt+1$

A design is $\alpha$-resolvable if $v=kn/\alpha$, $b=tn$, and $r=t\alpha$.

The incidence matrix of a block design with parameters $(v, b, k, r, \lambda)$ can be regarded as a binary equidistant code with $v$ number of code words, $b$ number of columns, and distance $d=2(r-\lambda)$. $d=2(bk/v)[(v-k)/(v-1)]$.

A special case of block design when the design parameters $v=b$, $k=r$, and $\lambda$ remains the same, we have the structure of combinatorial difference-sets. A general $(v, k, \lambda)$ difference-set $\{D\}=\{d_0, d_1, d_2, \ldots, d_{k-1}\}$ is defined as a collection of k residues (elements) modulo-v, such that for any positive integer (mod v), which is not necessary an element of $\{D\}$, the congruence $d_i-d_j=\delta$ (mod v) has $\lambda$ solution pairs $(d_i-d_j)$ with $d_i$, $d_j$ in $\{D\}$. $(\lambda, k, v)$ are the parameters of $\{D\}$. There exist more than one way to construct difference-sets. Since block designs can be obtained from both projective and Euclidean geometries, we have projective geometry difference-sets $\{D_p\}$, and Euclidean geometry difference-sets $\{D_E\}$.

Step 1: Given any nonzero positive integer m and a prime p, Let the block design parameters be:

$$v=b=p^{2m}+p^m+1, r=k=p^m+1, \text{and } \lambda=1 \tag{63}$$

An extension field $GF(p^{m(t+1)})$ can be generated from an irreducible polynomial $f_0(x)$ of degree $m(t+1)$ over $GF(p)$, the ground field. For difference-sets derivable from planar projective geometry, $t=2$. For $p=2$, the coefficients of $f_0(x)$ are either 0 or 1.

Step 2: $GF(p^m)$ relates to $GF(p)$ by identifying the elements of $GF(p)$ and its corresponding field generator polynomial $f(w)$. Start with a primitive element $\beta$ which satisfies the irreducible equation $f(\beta)=\beta^3+w\ \beta^2+w\ \beta+w=0$ over $GF(p^m)$.

Step 3: Obtain all the powers of $\beta$ modulo $-f(w)$, and identify all the zero coefficients of the $\beta^2$ column. The powers of $\beta$ corresponding to the zero coefficients are the residues or elements of the difference-set.

EXAMPLE 9

Step 1: let $p=m=t=2$. The block design parameters are:

$v=b=2^4+2^2+1=21$, $r=k=2^2+1=5$, and $\lambda=1$

The extension field $GF(p^{2(2+1)})=GF(p^6)$ can be generated from the polynomial $f_0(x)=x^6+x^5+x^3+x^2+x+1$ Irreducible over $GF(2)$.

Step 2: $GF(p^6)$ can be obtained from $GF(2)$ by identifying the elements 0, 1, w, 1+w of $f(w)=w^2+w+1$; and $GF(p^6)$ satisfies Step 3: When $f(w)=0$, $w^2=w+1$. and $\beta^4=w\ \beta^3+w\ \beta^2+w\beta=w(w\ \beta^2+w\ \beta+w)+w\ \beta^2+w\beta=(w+1)[\beta^2+\beta+1]+w\ \beta^2+w\beta=(1+w)+\beta^2+\beta$.

With these relations all the powers of $\beta$ can be generated as:

|            | $\beta^0$ | $\beta$ | $\beta^2$ |
|------------|-----------|---------|-----------|
| $\beta^0$  | 1         | 0       | 0         |
| $\beta$    | 0         | 1       | 0         |
| $\beta^2$  | 0         | 0       | 1         |
| $\beta^3$  | w         | w       | w         |
| $\beta^4$  | 1+w       | 1       | 1         |
| $\beta^5$  | w         | 1       | 1+w       |
| $\beta^6$  | 1         | 1+w     | 0         |
| $\beta^7$  | 0         | 0       | 1+w       |
| $\beta^8$  | 1         | 1       | 0         |
| $\beta^9$  | 0         | 1       | 1         |
| $\beta^{10}$ | w       | w       | 1+w       |
| $\beta^{11}$ | 1       | 1+w     | 1+w       |
| $\beta^{12}$ | 1       | 0       | w         |
| $\beta^{13}$ | 1+w     | w       | 1+w       |
| $\beta^{14}$ | 1       | w       | 1+w       |
| $\beta^{15}$ | 1       | 0       | 1+w       |
| $\beta^{16}$ | 1       | 0       | 1         |
| $\beta^{17}$ | w       | 1+w     | w         |
| $\beta^{18}$ | 1+w     | 1       | 0         |
| $\beta^{19}$ | 0       | 1+w     | 1         |
| $\beta^{20}$ | w       | w       | 1         |

The zero coefficients under $\beta^2$ column are: $\alpha^0, \beta^1, \beta^6, \beta^8$, and $\beta^{18}$. The powers of these $\beta$'s are $\{0, 1, 6, 8, 18\}$, which are the elements of the corresponding difference-set with $v=21$, $k=5$, and $\lambda=1$.

EXAMPLE 10

If $m=1$ the steps can be simplified as follows: $GF(p^{m(t+1)})=GF(2^3)$, which can be generated by $f_0(x)=x^3+x+1$. With $\beta$ its root $f_0(\beta)=0$, $\beta^3=\beta+1$.

|           |   |   | ↓ |
|-----------|---|---|---|
| $\beta^0$ | 1 | 0 | 0 ◄ |
| $\beta^1$ | 0 | 1 | 0 ◄ |
| $\beta^2$ | 0 | 0 | 1 |
| $\beta^3$ | 1 | 1 | 0 ◄ |
| $\beta^4$ | 0 | 1 | 1 |
| $\beta^5$ | 1 | 1 | 1 |
| $\beta^6$ | 1 | 0 | 1 |

The powers of $\beta$ corresponding to the zeros in the last column are $\{0, 1, 3\}$. This is projective geometry difference-set with parameters $v=7$, $k=3$, and $\lambda=1$.

A $(n_o, k_o, d)$ threshold decodable convolutional codes has a block of $k_o$ information digits, and a block of $n_o-k_o$ parity check digits. The code constraint length is defined as $n_A=(m+1)n_o$, where m is the largest memory size. Orthogonality is the key to construct this class codes. Orthogonality can be obtained by using projective geometry derived difference-sets, which can be derived from block designs.

EXAMPLE 11

A modified block design v=20, r=4 is shown as:

| $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ |
|---|---|---|---|---|---|---|---|---|---|---|---|---|---|---|---|---|---|---|---|
| 1 | 0 | 0 | 1 | 0 | 0 | 0 | 0 | 0 | 0 | 0 | 0 | 0 | 0 | 0 | 1 | 0 | 0 | 0 | 1 |
| 1 | 0 | 0 | 0 | 0 | 0 | 0 | 0 | 1 | 0 | 0 | 0 | 0 | 0 | 0 | 0 | 0 | 1 | 1 | 0 |
| 1 | 0 | 0 | 0 | 0 | 0 | 1 | 0 | 0 | 0 | 0 | 1 | 0 | 1 | 0 | 0 | 0 | 0 | 0 | 0 |

From the corresponding block numbers:
the first row: {0, 3, 15, 19}
the second row: {0, 8, 17, 18}
the third row: {0, 6, 11, 13}
The corresponding code generator polynomials are,
$G_0(D)=1+D^3+D^{15}+D^{19}$
$G_1(D)=1+D^8+D^{17}+D^{18}$
$G_2(D)=1+D^6+D^{11}+D^{13}$ This is a rate 0.75, $k_o=3$, $n_o=4$, m=19, J=4, and $n_A=(1+19) \times 4=80$ threshold decodable convolutional code. In this example the entries in the block design are the elements of projective difference-sets:
$\{D_0\}=\{d_0=0, d_1=3, d_2=15, d_3=19\}$
$\{D_1\}=\{d_0=0, d_1=8, d_2=17, d_3=18\}$
$\{D_2\}=\{d_0=0, d_1=6, d_2=11, d_3=13\}$ Therefore, the key to have more threshold decodable convolutional codes is also to have more either block designs and/or more difference-sets.

Figure 13:
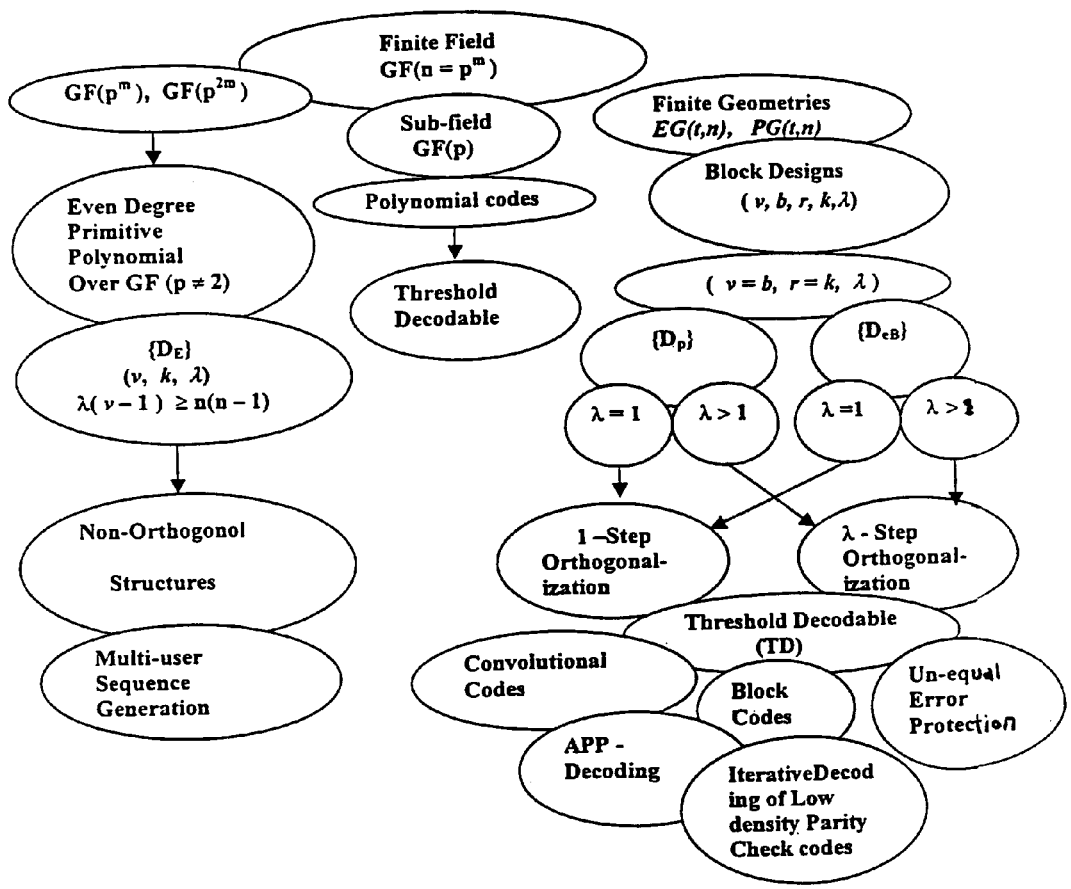
FIG. 13 shows algebraic, geometric and related elements of threshold decoding.

FIG. 13 shows algebraic, geometric, finite field, and related elements to the fundamentals of error coding.

While the invention has been described with reference to specific embodiments, modifications and variations of the invention can be constructed without departing from the scope of the invention.

I claim:

1. A communication method for optimally combining wireless asynchronous transfer mode (ATM), Internet, and satellite communication systems, the method comprising the steps of:

receiving Internet user data from an application layer;
forming a payload data field by adding one or more headers to said Internet user data, each of the one or more headers produced according to one of the following protocols: Transmission Control Protocol (TCP), User Datagram Protocol (UDP), Internet Protocol (IP), Internet Group Management Protocol (IGMP), Internet Control Message Protocol (ICMP), Address Resolution Protocol (ARP), Reverse Address Resolution Protocol (RARP), Wireless Application Protocol (WAP), Internet Multicast Protocol (IMP), Real-time Transport Protocol (RTP), and Point to Point Protocol (PPP);
creating one or more ATM cells, the creating step comprising:
  segmenting said payload field into fixed size ATM information fields;
  encoding the ATM information fields;
  and attaching an ATM cell header to each encoded ATM information field to form an ATM cell wherein a Header Error Correction (HEC) byte of said ATM cell header is generated by using four header information bits in each column of said header to generate a single parity check bit which is written to the bit location of the HEC byte corresponding to the column of the four header information bits;

wherein the step of encoding the ATM information fields is performed using a processor, a speed selection unit, and an encoder selection unit;

wherein the step of encoding is based on at least a required level of error correction and uses said processor to implement three encoding steps in series by using three error correction codecs connected in series, wherein each of the three codecs is either identical or different, wherein a first service demanding a lowest error rate is encoded using all three of said codecs, a second service demanding a highest error rate is encoded using only one of said codecs and a third service demanding an error rate between the lowest error rate and the highest error rate is encoded using two of said codecs, wherein the codecs are programmable with clock changes;

wherein said speed selection unit selects a transmission speed from a plurality of different transmission speeds;

wherein said encoder selection unit selects a particular encoder or set of encoders for a particular service based upon the error rate of the particular service and said selected transmission speed;

attaching the ATM cell to a unique word and Cell and Bit Timing Recovery (CBTR) information to form a traffic burst;

attaching a reference burst to the traffic burst to form a basic frame;

combining multiple basic frames into a multi-frame, combining multiple multi-frames into a control frame, combining multiple control frames into a superframe; and transmitting multiple superframes.

2. The method of claim 1, further comprising providing error codes in the ATM, Internet and satellite systems.

3. The method of claim 1 further comprising providing error codes in the Internet header and in the ATM header sequences for applications in very large numbers of user networks, for acquisitioning and synchronizing, for spectrum spreading, for modest levels of encrypting and decrypting, for user identifying, and for common channel multiple accessing, used in the transmission and reception of data.

4. The method of claim 3, further comprising providing acquisition, synchronization, and multiple accessing sequence generation by breaking an allowable sequence length into segments, which in turn are generated by methods of claim 3.

5. The method of claim 1, further comprising improving both the auto-correlation and cross correlation properties of any sequence or word for frame synchronization by binary or non-binary error coding, but without error correction.

6. The method of claim 1, further comprising yielding 384 bits per convolutional code constraint length as required in an information field, and providing a convolutional code of coding rate 0.875 with multiple error correction capabilities.

7. The method of claim 1, further comprising meeting the international protocol standards for ATM, Internet, and satellite communications comprising the ATM cell switching structure, 15 Internet transmission protocol standards, and the international digital satellite communications framing recommendations.

* * * * *